US009496912B2

(12) United States Patent
Hidaka et al.

(10) Patent No.: US 9,496,912 B2
(45) Date of Patent: *Nov. 15, 2016

(54) ELECTRONIC APPARATUS

(71) Applicant: KYOCERA Corporation, Kyoto-shi, Kyoto (JP)

(72) Inventors: Mizuho Hidaka, Kawasaki (JP); Norikazu Morioka, Yokohama (JP); Hiroyoshi Kawanishi, Sanda (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/094,861

(22) Filed: Apr. 8, 2016

(65) Prior Publication Data

US 2016/0226548 A1 Aug. 4, 2016

Related U.S. Application Data

(63) Continuation of application No. 14/843,874, filed on Sep. 2, 2015, now Pat. No. 9,357,041, which is a continuation of application No. 14/458,916, filed on Aug. 13, 2014, now Pat. No. 9,136,898.

(30) Foreign Application Priority Data

Dec. 24, 2013 (JP) .................. 2013-264906
May 28, 2014 (JP) .................. 2014-110276

(51) Int. Cl.
*H04B 1/3888* (2015.01)
*G06F 1/16* (2006.01)
(Continued)

(52) U.S. Cl.
CPC .......... *H04B 1/3888* (2013.01); *G06F 1/1605* (2013.01); *G06F 1/1637* (2013.01);
(Continued)

(58) Field of Classification Search
CPC .... G06F 1/1656; G06F 1/1647; H04M 1/02; H04M 1/0264; H04M 1/0266; H04M 1/035; H04M 1/72575; H04M 1/0243; H04M 1/0249; A47B 81/06; H04B 1/3888; H04B 17/23; H04B 1/03
See application file for complete search history.

(56) References Cited

U.S. PATENT DOCUMENTS 8,773,373 B2 * 7/2014 Sato ................. G06F 3/016
174/126.4
2008/0100769 A1 * 5/2008 Hsiao .............. G02F 1/133308
349/58
(Continued)

FOREIGN PATENT DOCUMENTS

JP H09-008690 A 10/1997
JP 2009-098427 A 5/2009
(Continued)

OTHER PUBLICATIONS

International Search Report Dated Mar. 31, 2015, issued for International Application No. PCT/JP2014/006384.
(Continued)

*Primary Examiner* — Andrew Wendell
*Assistant Examiner* — Maryam Soltanzadeh
(74) *Attorney, Agent, or Firm* — Procopio Cory Hargreaves and Savitch LLP

(57) ABSTRACT

A cover panel made of sapphire is provided on a surface of electronic apparatus. The electronic apparatus includes a casing that supports a first area positioned in an edge area of the cover panel; a first component that is disposed so as to face a second area positioned further inside than the first area in the cover panel; and a supporting structure that supports a third area positioned between the first and second areas and separated from the first and second areas in the panel.

10 Claims, 24 Drawing Sheets

(51) Int. Cl.
*H04M 1/02* (2006.01)
*H04M 1/18* (2006.01)

(52) U.S. Cl.
CPC ........... *G06F1/1656* (2013.01); *G06F 1/1658* (2013.01); *G06F 1/1688* (2013.01); *H04M 1/0202* (2013.01); *H04M 1/0264* (2013.01); *H04M 1/0266* (2013.01); *H04M 1/185* (2013.01)

(56) References Cited

U.S. PATENT DOCUMENTS

| | | |
|---|---|---|
| 2011/0043106 A1 | 2/2011 | Higashikawa |
| 2012/0169718 A1 | 7/2012 | Schindler |
| 2013/0016524 A1* | 1/2013 | Momose ........... G02F 1/133308 362/602 |
| 2013/0236699 A1 | 9/2013 | Prest et al. |
| 2013/0328792 A1 | 12/2013 | Myers et al. |
| 2014/0023430 A1 | 1/2014 | Prest et al. |
| 2014/0030443 A1 | 1/2014 | Prest et al. |
| 2014/0211117 A1* | 7/2014 | Choi ..................... G02F 1/1368 349/43 |
| 2015/0022436 A1* | 1/2015 | Cho ..................... G06F 1/1652 345/156 |
| 2015/0036864 A1 | 2/2015 | Ozasa et al. |

FOREIGN PATENT DOCUMENTS

| | | |
|---|---|---|
| JP | 2010-224234 A | 10/2010 |
| JP | 2012-215682 A | 11/2012 |
| JP | 2013-243564 A | 12/2013 |
| JP | 2013-243615 A | 12/2013 |
| WO | 02024716 A2 | 7/2002 |
| WO | 02054426 A1 | 7/2002 |
| WO | 02054427 A1 | 7/2002 |
| WO | 02054718 A2 | 7/2002 |
| WO | 02054721 A1 | 7/2002 |
| WO | 02054723 A1 | 7/2002 |
| WO | 02054724 A1 | 7/2002 |
| WO | 02054846 A1 | 7/2002 |
| WO | 2012/064567 A1 | 5/2012 |

OTHER PUBLICATIONS

Office Action dated Sep. 29, 2015, issued in counterpart Japanese Application No. 2014-110276.

* cited by examiner

ELECTRONIC APPARATUS

CROSS-REFERENCE TO RELATED APPLICATION

The present application is a continuation of U.S. application Ser. No. 14/843,874 filed on Sep. 2, 2015, which is a continuation of U.S. application Ser. No. 14/458,916, filed on Aug. 13, 2014, now U.S. Pat. No. 9,136,898, and claims priority to Japanese Patent App. No. 2014-110276 filed on May 28, 2014, and Japanese Patent App. No. 2013-264906 filed on Dec. 24, 2013, the entirety of each of these applications is incorporated herein by reference.

FIELD

The present invention relates to an electronic apparatus, and more specifically to cover panel support structures.

BACKGROUND

In the related art various techniques related to providing cover panels for an electronic apparatus have been proposed. These cover panels are subject to breakage and other damage such as cracking and chipping.

SUMMARY

A panel on a surface of an electronic apparatus provides resistance to breakage, cracking and chipping.

In one example, a panel made of sapphire is provided on a surface of the electronic apparatus. A casing supports a first, periphery area, of the panel. A first component is disposed inside of the casing and is positioned to face a second area of the panel that is inside of the periphery area. A supporting structure supports a third area positioned between the first area and the second area and separated from the first area and the second area in the panel.

The casing first component and supporting structure provide the panel support to reduce breakage, cracking and chipping of the panel.

DETAILED DESCRIPTION

External Appearance of Electronic Apparatus

Figure 1:
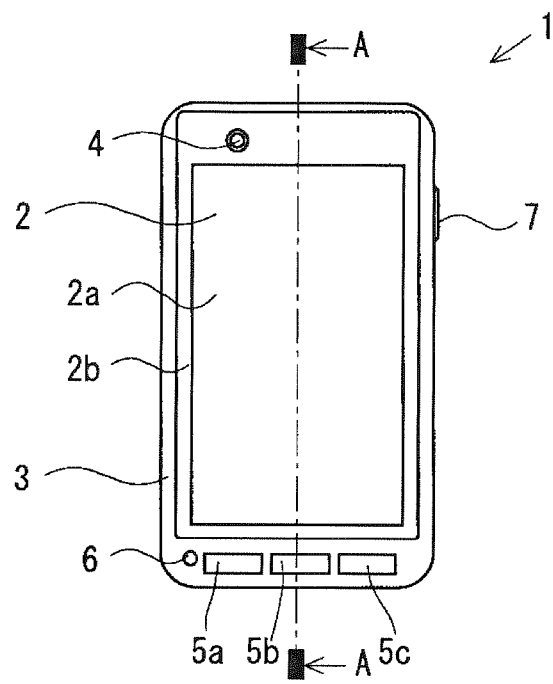
FIG. 1 is a front view illustrating an example of an external appearance of an electronic apparatus.
Figure 2:
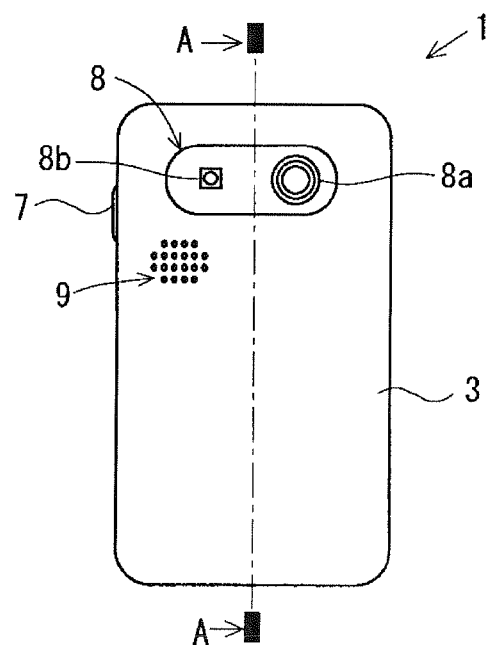
FIG. 2 is a rear view illustrating an example of an external appearance of the electronic apparatus.

FIGS. 1 and 2 are respectively a front side view and a rear side view illustrating an external appearance of an electronic apparatus 1. The electronic apparatus 1 may be a mobile phone such as a smart phone, and can communicate with another communication device via a base station, a server, and the like. As illustrated in the example in FIGS. 1 and 2, the electronic apparatus 1 has a plate-like shape that is substantially rectangular in a plan view. As illustrated in FIGS. 1 and 2, the outer plate (surface) of the electronic apparatus 1 includes a cover panel 2 and a casing 3.

The cover panel 2 has a plate-like shape and an approximately rectangular shape in a plan view. The cover panel 2 constitutes a portion other than an edge area in the front surface of the electronic apparatus 1 as illustrated in FIG. 1. The cover panel 2 includes a first surface 70 that constitutes a portion of the front surface of the electronic apparatus 1 and a second surface 71 that is positioned on the opposite side to the first surface 70 (see FIG. 9 described below). Hereinafter, the first surface 70 is referred to as an "outer surface 70" and the second surface 71 is referred to as an "inner surface 71."

The cover panel 2 is made of, for example, sapphire. That is, the cover panel 2 is a panel of a one-layer structure having a layer made of sapphire which is disposed on the surface of the electronic apparatus 1. Here, sapphire refers to a single crystal containing alumina ($Al_2O_3$) as a main component, and a single crystal whose purity of Al₂O₃ is approximately greater than or equal to 90% in the present specification. The purity of Al₂O₃ is preferably greater than or equal to 99% which provides a resistance to damage to the cover panel and a reduction of cracks or chipping.

In an example embodiment, the cover panel 2 is a panel of a one-layer structure having a layer made of sapphire which is disposed on the surface of the electronic apparatus 1. However, the cover panel 2 may be a composite panel (laminated panel) of a multilayer structure having such a layer. For example, the cover panel 2 may be a composite panel of a two-layered structure configured of a first layer (sapphire panel) made of sapphire which is disposed on the surface of the electronic apparatus 1 and a second layer (glass panel) made of glass which is attached to the first layer. In addition, the cover panel 2 may be a composite panel of a three-layered structure configured of a layer (sapphire panel) made of sapphire which is disposed on the surface of the electronic apparatus 1, a layer (glass panel) made of glass which is attached to the layer made of sapphire, and a layer (sapphire panel) made of sapphire which is attached to the layer made of glass. Further, the cover panel 2 may include a layer made of crystalline materials other than sapphire such as diamond, zirconia, titania, crystal, lithium tantalate, and aluminum oxynitride.

Figure 3:
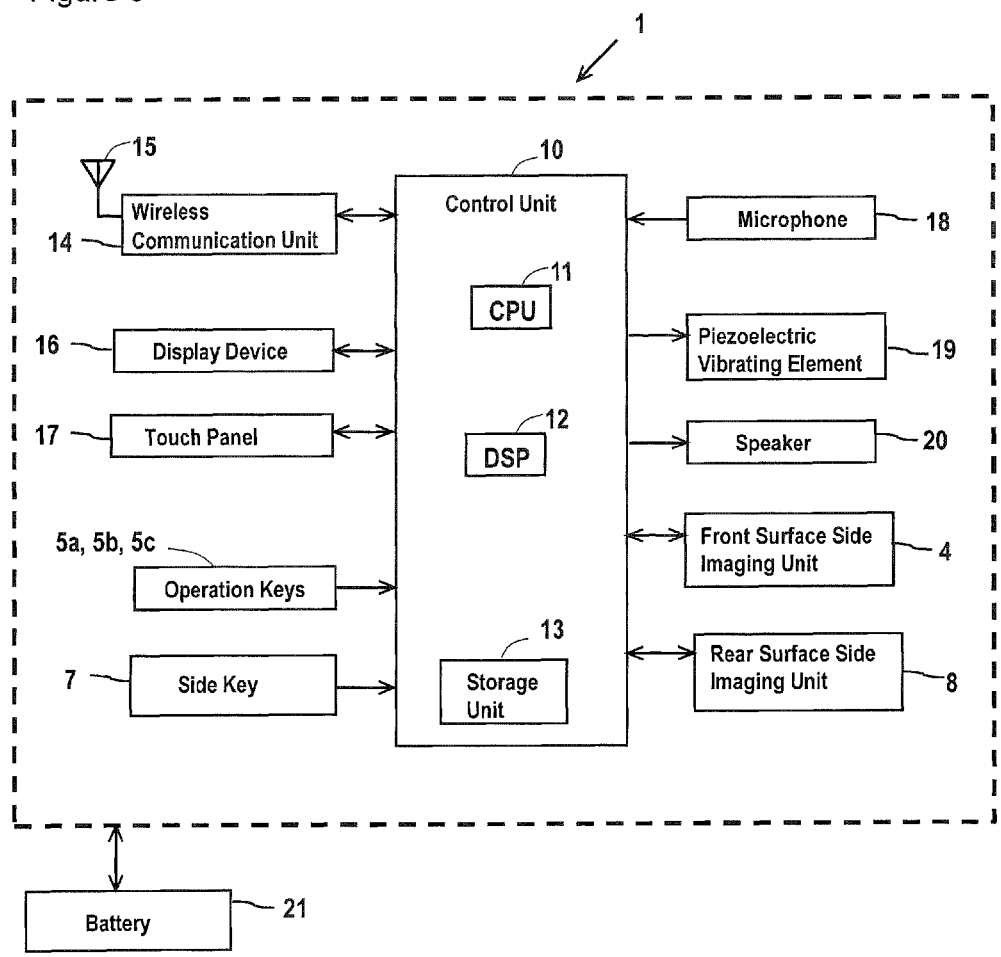
FIG. 3 is a block diagram illustrating an example electrical configuration of the electronic apparatus.

The cover panel 2 includes a display area 2a and an edge area 2b, for example a peripheral edge. Various pieces of information such as characters, symbols, figures, and moving images displayed by a display device 16, as described below with reference, for example, to FIG. 3, are visually recognized by a user through the display area 2a in the cover panel 2. The edge area 2b in the cover panel 2 that surrounds the display area 2a may be black because of, for example, a film being attached thereto. Accordingly, the display by the display device 16 is difficult to be visually recognized by the user through the edge area 2b.

A front imaging unit 4 is disposed on the upper end of the cover panel 2. The touch panel 17 described below with reference, for example, to FIG. 3, is attached to the inner surface 71 of the cover panel 2. The user can provide various instructions with respect to the electronic apparatus 1 by operating the display area 2a of the cover panel 2 using a finger or the like.

The casing 3 includes the edge area of the front surface, the side surface, and the rear surface of the electronic apparatus 1. The casing 3 is made of, for example, a resin. Operation keys 5a, 5b, and 5c and a microphone hole 6 are provided in the edge area of the front surface of the electronic apparatus 1 in the casing 3. In the electronic apparatus 1 illustrated in FIG. 1, the operation keys 5a to 5c are hardware keys, but the respective operation keys 5a to 5c may be software keys displayed on the display area 2a. The microphone hole 6 may be provided in a portion other than the cover panel 2, for example, on the casing 3 as described above. For example, the microphone hole 6 may be provided on the side surface or the rear surface of the casing 3 so as not to pick up the operation sound when the display area 2a is operated by the user during communication on the phone.

A side key 7 which activates the electronic apparatus 1 is provided on the side surface of the electronic apparatus 1. In addition, a rear imaging unit 8 including an imaging device 8a and a lighting device 8b, and speaker holes 9 are provided on the rear surface of the electronic apparatus 1 as illustrated in FIG. 2. The lighting device 8b is, for example, a light-emitting diode (LED) that plays a role of a flash emitting light while performing imaging with the imaging device 8a.

Electrical Configuration of Electronic Apparatus

FIG. 3 is a block diagram illustrating the electrical configuration of the electronic apparatus 1. As illustrated in FIG. 3, the electronic apparatus 1 includes the control unit 10, a wireless communication unit 14, the display device 16, the touch panel 17, the operation keys 5a to 5c, the side key 7, a microphone 18, the piezoelectric vibrating element 19, a speaker 20, the front imaging unit 4, the rear imaging unit 8, and a battery 21. These elements which are provided in the electronic apparatus 1 are accommodated in the casing 3 of the electronic apparatus 1.

The control unit 10 includes a Central Processing Unit (CPU) 11, a Digital Signal Processor (DSP) 12, and a storage unit 13. The control unit 10 manages the overall operation of the electronic apparatus 1 by controlling other elements of the electronic apparatus 1. The storage unit 13 is, for example, a ROM (Read Only Memory) and a RAM (Random Access Memory). Main programs, a plurality of application programs, and the like which are control programs for controlling the electronic apparatus 1, specifically, for controlling respective elements such as the wireless communication unit 14, the display device 16, and the like included in the electronic apparatus 1, are stored in the storage unit 13. Various functions of the control unit 10 can be realized by the CPU 11 and the DSP 12 executing various programs in the storage unit 13.

The wireless communication unit 14 includes an antenna 15. The wireless communication unit 14 receives or transmits a communication signal from/to a mobile phone different from the electronic apparatus 1, and/or to a communication device such as a web server connected to the Internet using an antenna 15 via a base station or the like.

The display device 16 is, for example, a liquid crystal display or an organic electroluminescence (EL) display. As described above, various pieces of information displayed on the display device 16 are visually recognized from the outside of the electronic apparatus 1 through the display area 2a.

The touch panel 17 is, for example, a projection type electrostatic capacitance touch panel. The touch panel 17 is attached to the inner surface 71 of the cover panel 2. The touch panel 17 includes two sheet-like electrode sensors which are disposed so as to face each other. When the user touches the display area 2a using such as a finger or the like, the electrostatic capacitance of the portion facing the operator in the touch panel 17 is changed. The touch panel 17 outputs an electrical signal according to the change of the electrostatic capacitance to the control unit 10. In this manner, the touch panel 17 can detect contact with respect to the display area 2a of the operator.

The operation keys 5a to 5c and the side key 7 output an electrical instruction signal to the control unit 10 when pressed. A voice or the like of the user is input to the microphone 18 during communication on the phone and the input voice or the like is converted to an electrical signal that is output to the control unit 10.

The piezoelectric vibrating element 19 is attached to the inner surface 71 of the cover panel 2. The piezoelectric vibrating element 19 is vibrated by a driving voltage applied from the control unit 10. The control unit 10 generates a driving voltage based on a sound signal and provides the driving voltage to the piezoelectric vibrating element 19. The cover panel 2 is vibrated by the piezoelectric vibrating element 19 which vibrates based on the driving voltage from the control unit 10. As a result, a reception sound is transmitted to the user from the cover panel 2. The volume of the reception sound is set to a degree such that the user can appropriately hear the sound when the cover panel 2 is put close to an ear of the user. Details of the piezoelectric vibrating element 19, and the reception sound transmitted to the user from the cover panel 2, are described below.

In the description below, a case in which the reception sound is transmitted to the user from the cover panel 2 by the piezoelectric vibrating element 19 is described, but a dynamic speaker that converts the electric sound signal from the control unit 10 into a sound and then outputs the sound may be adopted instead of the piezoelectric vibrating element 19. Receiver holes are provided in the cover panel 2 or the casing 3 when a dynamic speaker is used. The sound output from the dynamic speaker is output to the outside from the receiver holes provided on the cover panel 2 or the casing 3. The volume of the sound output from the receiver holes is set to be smaller than that of the sound output from the speaker holes 9.

The speaker 20 provides a reception signal or the like to the user who is present at a location separated from the electronic apparatus 1 by converting the electrical sound signal input from the control unit 10 into a sound and then outputting the sound. The front imaging unit 4 and the rear imaging unit 8 capture still images and moving images. The battery 21 outputs a power source for use by the electronic apparatus 1. The power output from the battery 21 is supplied to respective electronic components contained in the control unit 10 or the wireless communication unit 14 included in the electronic apparatus 1.

Details of Piezoelectric Vibrating Element

Figure 4:
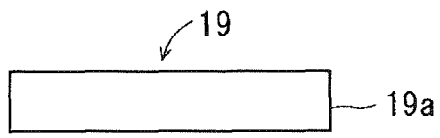
FIG. 4 is a top view illustrating an example of a structure of a piezoelectric vibrating element.
Figure 5:
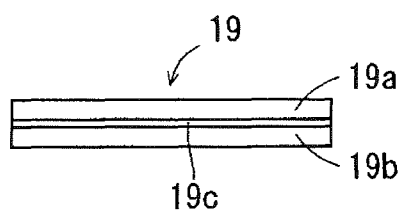
FIG. 5 is a side view illustrating an example of a structure of the piezoelectric vibrating element.

FIGS. 4 and 5 illustrate a top view and a side view, respectively, of a structure of the piezoelectric vibrating element 19. As illustrated in FIGS. 4 and 5, the piezoelectric vibrating element 19 has a long shape in one direction. Specifically, the piezoelectric vibrating element 19 has a long and narrow rectangular plate shape in a plan view. The piezoelectric vibrating element 19 has, for example, a bimorph structure. The piezoelectric vibrating element 19 includes a first piezoelectric ceramic plate 19a and a second piezoelectric ceramic plate 19b which are bonded to each other through a shim material 19c.

The configuration of the piezoelectric vibrating element is not limited to the specific example described above. For example, a piezoelectric vibrating element in which a piezoelectric plate is configured of organic piezoelectric materials such as polyvinylidene fluoride and polylactic acid may be used.

In the piezoelectric vibrating element 19, when a positive voltage is applied to the first piezoelectric ceramic plate 19a and a negative voltage is applied to the second piezoelectric ceramic plate 19b, the first piezoelectric ceramic plate 19a extends along the longitudinal direction and the second piezoelectric ceramic plate 19b contracts along the longitudinal direction. Accordingly, as illustrated in FIG. 6, the piezoelectric vibrating element 19 is bent into a convex shape with the first piezoelectric ceramic plate 19a being outside.

In contrast, in the piezoelectric vibrating element 19, when a negative voltage is applied to the first piezoelectric ceramic plate 19a and a positive voltage is applied to the second piezoelectric ceramic plate 19b, the first piezoelectric ceramic plate 19a contracts along the longitudinal direction, and the second piezoelectric ceramic plate 19b extends along the longitudinal direction. Accordingly, as illustrated in FIG. 7, the piezoelectric vibrating element 19 is bent into a convex shape with the second piezoelectric ceramic plate 19b being outside.

Figure 6:
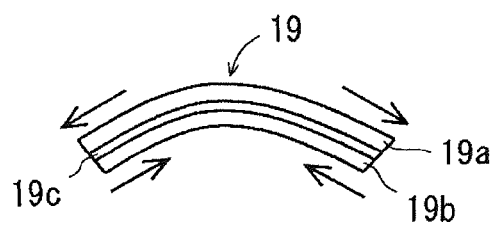
FIG. 6 is a view illustrating an example of a state of the piezoelectric vibrating element flexurally vibrating.
Figure 7:
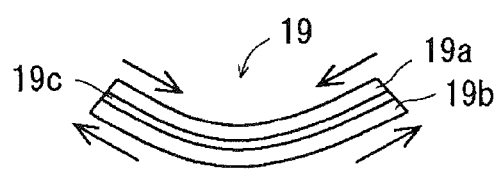
FIG. 7 is a view illustrating an example of a state of the piezoelectric vibrating element flexurally vibrating.

The piezoelectric vibrating element 19 flexurally vibrates by alternatively taking on the state of FIG. 6 and the state of FIG. 7. The control unit 10 allows the piezoelectric vibrating element 19 to flexurally vibrate by applying an alternating current (AC) voltage between the first piezoelectric ceramic plate 19a and the second piezoelectric ceramic plate 19b.

Only one structure configured of the first piezoelectric ceramic plate 19a and the second piezoelectric ceramic plate 19b, which are bonded to each other by interposing the shim material 19c therebetween, is provided in the piezoelectric vibrating element 19 illustrated in FIGS. 4 to 7. However, a plurality of the structures may be laminated to each other. For example, 28 or more layers that are laminated provide an increased level of vibration that can be transmitted to the cover panel 2. Accordingly, 44 or more layers that are laminated provide an increased sufficiency in the vibration that can be transmitted to the cover panel 2.

The piezoelectric vibrating element 19 having such a structure is disposed on the edge area of the inner surface 71 of the cover panel 2. Specifically, the piezoelectric vibrating element 19 is disposed in a central portion in a short-length direction (lateral direction) in the upper end of the inner surface 71 of the cover panel 2. The longitudinal direction of the piezoelectric vibrating element 19 is arranged along the short-length direction of the cover panel 2. In this manner, the piezoelectric vibrating element 19 flexurally vibrates along the short-length direction of the cover panel 2. Further, the center in the longitudinal direction of the piezoelectric vibrating element 19 corresponds to the center in the short-length direction of the upper end of the inner surface 71 of the cover panel 2.

Here, as illustrated in FIGS. 6 and 7, the center in the longitudinal direction of the piezoelectric vibrating element 19 flexurally vibrating has the largest displacement amount. Accordingly, an area whose displacement, at a time of flexural vibration, is the largest in the piezoelectric vibrating element 19 corresponds to the center in the short-length direction of the upper end of the inner surface 71 of the cover panel 2 since the center in the longitudinal direction of the piezoelectric vibrating element 19 corresponds to the center in the short-length direction of the upper end of the inner surface 71 of the cover panel 2.

Regarding Generation of Reception Sound

In the electronic apparatus 1, an air conduction sound and a conduction sound are transmitted to the user by the piezoelectric vibrating element 19 through the cover panel 2 which is vibrated by the piezoelectric vibrating element 19. That is, the vibration of the piezoelectric vibrating element 19 is transmitted to the cover panel 2 so that the air conduction sound and the conduction sound are transmitted to the user from the cover panel 2.

Here, the term "air conduction sound" means a sound recognized in a human brain by the vibration of an eardrum due to a sound wave (air vibration) which enters an external auditory meatus hole (a so-called "ear hole"). On the other hand, the term "conduction sound" is a sound recognized in a human brain by the vibration of the eardrum due to the vibration of an auricle transmitted to the eardrum. Hereinafter, the air conduction sound and the conduction sound will be described in detail.

Figure 8:
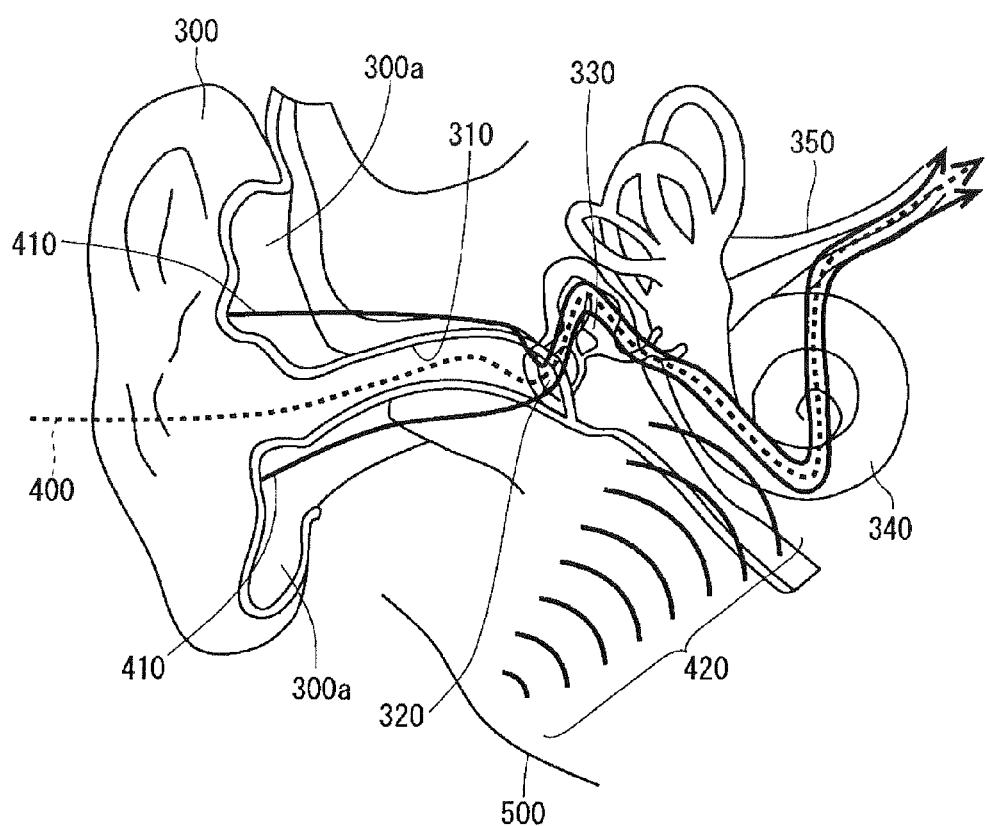
FIG. 8 is a view for describing an air conduction sound and a bone conduction sound.

FIG. 8 is a view for describing the air conduction sound and the conduction sound. FIG. 8 illustrates a structure of an ear of the user of the electronic apparatus 1. In FIG. 8, a dotted line 400 indicates a conduction path of a sound signal (sound information) of the air conduction sound. A solid line 410 indicates the conduction path of the sound signal of the conduction sound.

When the piezoelectric vibrating element 19 mounted on the cover panel 2 vibrates based on the electric sound signal indicating the reception sound, the cover panel 2 vibrates, and a sound wave is output from the cover panel 2. When the user moves the cover panel 2 of the electronic apparatus 1 close to an auricle 300 of the user by holding the electronic apparatus 1 in a hand, or the cover panel 2 of the electronic apparatus 1 is set to (brought into contact with) the auricle 300 of the user, the sound wave output from the cover panel 2 enters an external auditory meatus hole 310. The sound wave from the cover panel 2 enters in the external auditory meatus hole 310 and the eardrum 320, and the eardrum 320 vibrates. The vibration of the eardrum 320 is transmitted to an auditory ossicle 330 and the auditory ossicle 330 vibrates. In addition, the vibration of the auditory ossicle 330 is transmitted to a cochlea 340 and is converted into an electrical signal in the cochlea 340. The electrical signal is transmitted to the brain by passing through an acoustic nerve 350 and the reception sound is recognized in the brain. In this manner, the air conduction sound is transmitted from the cover panel 2 to the user.

Further, when the user puts the cover panel 2 of the electronic apparatus 1 to the auricle 300 of the user by holding the electronic apparatus 1 in a hand, the auricle 300 is vibrated by the cover panel 2, which cover panel 2 is vibrated by the piezoelectric vibrating element 19. The vibration of the auricle 300 is transmitted to the eardrum 320, and thus the eardrum 320 vibrates. The vibration of the eardrum 320 is transmitted to the auditory ossicle 330, and thus the auditory ossicle 330 vibrates. The vibration of the auditory ossicle 330 is transmitted to the cochlea 340 and is converted into an electrical signal in the cochlea 340. The electrical signal is transmitted to the brain by passing through the acoustic nerve 350 and the reception sound is recognized in the brain. In this manner, the conduction sound is transmitted from the cover panel 2 to the user. FIG. 8 illustrates an auricular cartilage 300a in the inside of the auricle 300.

Bone conduction sound is a sound recognized in a human brain by the vibration of the skull and direct stimulation of the inner ear such as the cochlea caused by the vibration of the skull. In FIG. 8, in a case of vibrating the jawbone 500, the transmission path of the sound signal while the bone conduction sound is recognized in the brain is indicated with a plurality of arcs 420.

As described above, the air conduction sound and the conduction sound can be transmitted from the cover panel 2 to the user of the electronic apparatus 1 due to the vibration of the cover panel 2 through the vibration of the piezoelectric vibrating element 19. The user can hear the air conduction sound from the cover panel 2 by moving the cover panel 2 close to an ear (auricle). Further, the user can hear the air conduction sound and the conduction sound from the cover panel 2 by bringing the cover panel 2 into contact with an ear (auricle).

Since the user can hear a sound when the user puts the cover panel 2 to an ear, communication using the electronic apparatus 1 can be performed without much concern regarding the position of the electronic apparatus 1 with respect to the ear.

In addition, since the user can hear the conduction sound due to the vibration of the auricle, it is easy for the user to hear the sound even when there is a large amount of ambient noise. Accordingly, the user can appropriately perform communication even when there is a large amount of the ambient noise.

In addition, even in a state in which earplugs or earphones are fixed to the ears of the user, the reception sound from the electronic apparatus 1 can be recognized by setting the cover panel 2 to the auricle. Further, even in the state in which headphones are fixed to the ears of the user, the reception sound from the electronic apparatus 1 can be recognized by putting the cover panel 2 to the headphones.

The sound from the cover panel 2 becomes easy to hear when the user moves the upper end of the cover panel 2 (particularly, the central portion of the upper end in the short-length direction DR2 which corresponds to the placement of the piezoelectric vibrating element 19) close to an ear, or puts the upper end thereof to an ear.

First Example Embodiment

Cross-Sectional View of Electronic Apparatus

Figure 9:
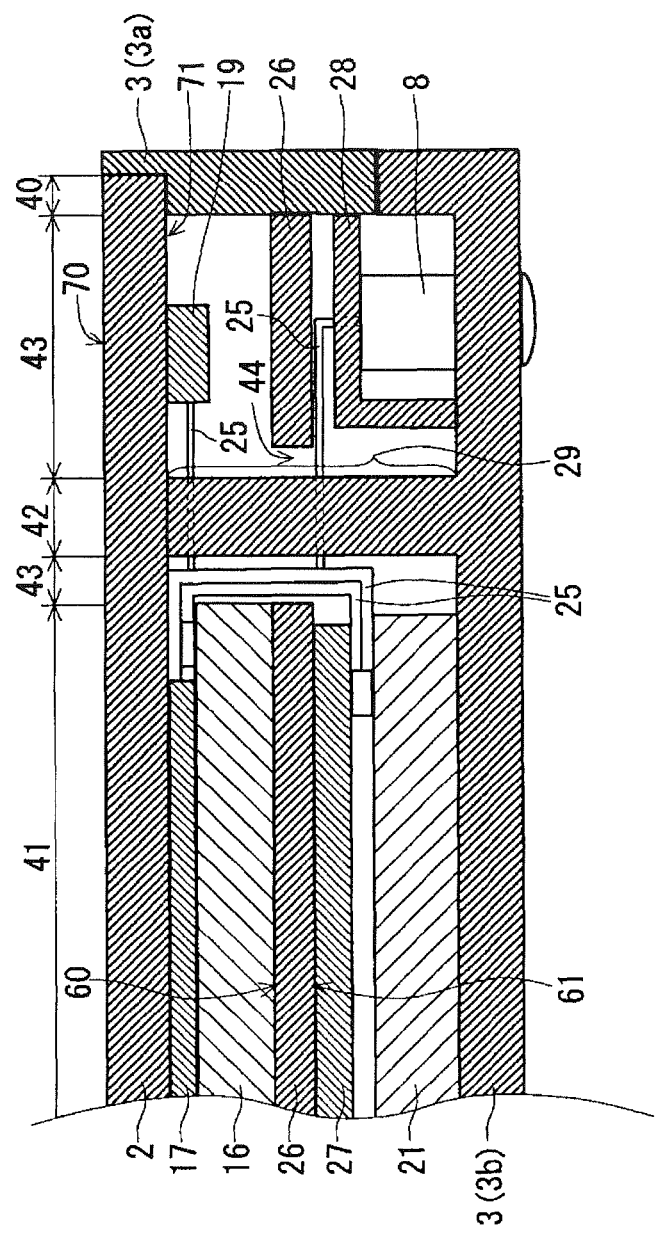
FIG. 9 is a view illustrating an example of a cross section of an electronic apparatus.
Figure 10:
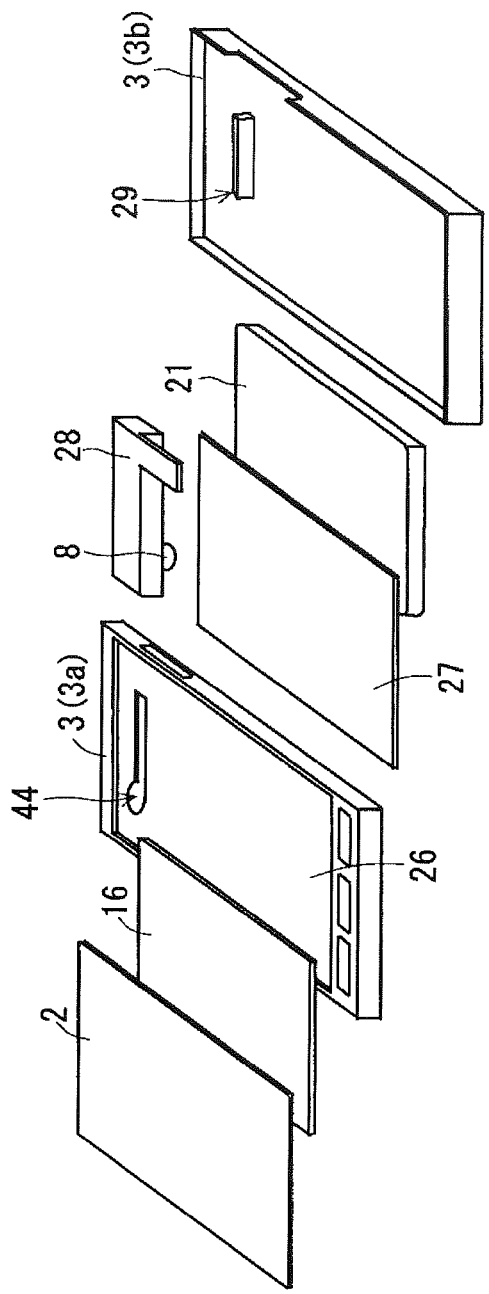
FIG. 10 is an example of an exploded perspective view of an electronic apparatus.

The configuration of an electronic apparatus 1 in which a cover panel 2 has resistance to breakage is described below. FIG. 9 is a cross-sectional view of the electronic apparatus 1 according to a first example embodiment. FIG. 9 is a cross-sectional view of the electronic apparatus 1 taken along a line A-A illustrated in FIGS. 1 and 2. FIG. 10 is an exploded perspective view of the electronic apparatus 1 according to the first example embodiment. In addition, in FIG. 10, some components, such as a plurality of cables (wirings) 25 (see FIG. 9) electrically connecting a plurality of electronic components to one another and the touch panel 17 included in the electronic apparatus 1, are omitted for avoiding complexity in the drawing.

As illustrated in FIGS. 9 and 10, a casing 3 of the electronic apparatus 1 in the present embodiment includes a front casing 3a and a back casing 3b. The front casing 3a and the back casing 3b are connected (fixed) to each other using a claw or the like, or are fixed to each other through fastening a screw or the like. A cover panel 2 is attached to the front casing 3a. An area attached to the front casing 3a (casing 3) in the cover panel 2 is referred to herein as a "first area 40".

Figure 11:
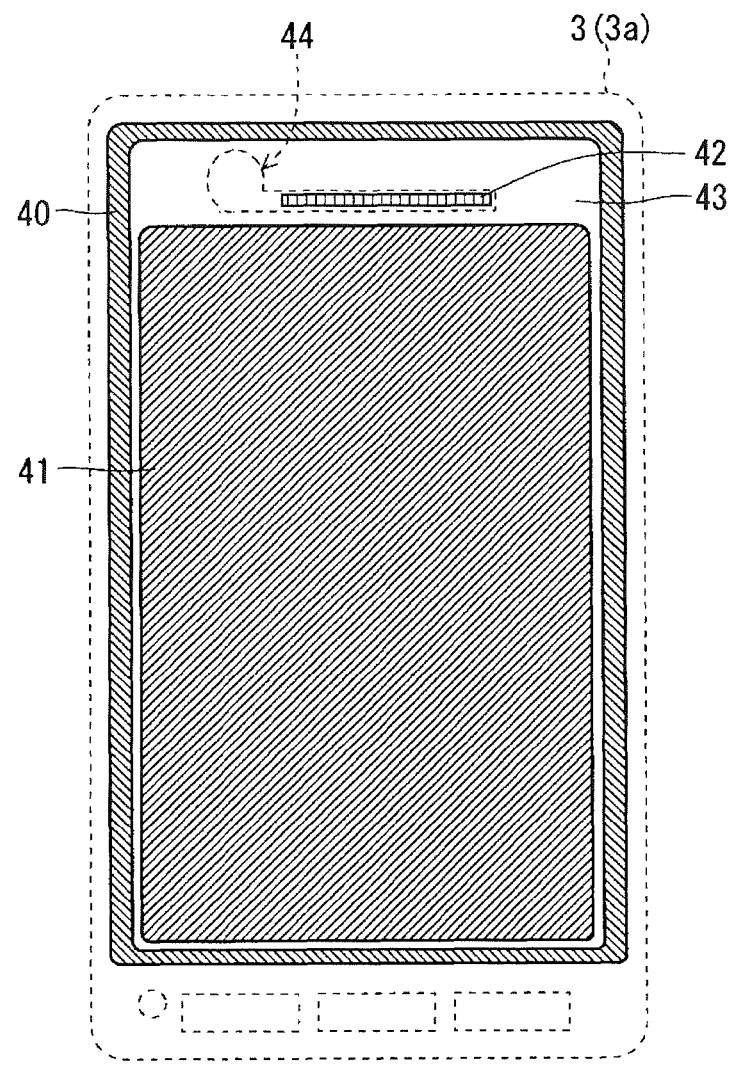
FIG. 11 is a view illustrating an example of a cover panel.

FIG. 11 is a view illustrating a cover panel 2 of the first example. In FIG. 11, the first area 40 is indicated by left-upward oblique lines. As illustrated in FIG. 11, the first area 40 is an edge area of the cover panel 2. In addition, as illustrated in FIG. 9, the first area 40 has resistance to deformation and breakage even when a load is applied from the outside because the first area 40 is supported by the front casing 3a. As shown in FIGS. 9, 10 and 11, casing 3 includes the front casing 3a and the back casing 3b. However, the casing 3 may be configured of only one member or a combination of three or more members.

As illustrated in FIGS. 9 and 10, the touch panel 17 and the piezoelectric vibrating element 19 are attached to the inner surface 71 of the cover panel 2 using a double-sided tape or an adhesive. The display device 16 is disposed so as to face the cover panel 2 and the touch panel 17 (more specifically, the cover panel 2 to which the touch panel 17 is attached). An area in the cover panel 2 facing the display device 16 is referred to as a "second area 41." As illustrated in FIG. 11, the second area 41 is positioned further inside the cover panel than the first area 40 in the cover panel 2. In FIG. 11, the second area 41 is indicated by right-upward oblique lines.

Referring again to FIGS. 9 and 10, a plate-like component 26 is disposed so as to face the cover panel 2 on the rear surface of the display device 16. The plate-like component 26 is provided to reduce deformation and cracks of the cover panel 2 due to a possible load applied to the cover panel 2 from the outside. The plate-like component 26 is made of a metal material such as SUS (Steel Use Stainless). The second area 41 faces a portion of the plate-like component 26. In addition, the second area 41 is supported by components (in the example of FIG. 9, the touch panel 17, the display device 16, the plate-like component 26, a printed board 27, and the battery 21) in the casing 3 of the electronic apparatus 1. The second area 41 has resistance to deformation and breakage due to rigidity or the like of the components in the casing 3 even when the load is applied from the outside. Since the cover panel 2 and the components in the casing 3 are supported by the plate-like component 26, even when the second area 41 is deformed, an amount of deformation in the second area 41 becomes small such that the second area 41 becomes resistant to breakage. For reinforcement, a concave portion extending along the short-length direction or the longitudinal direction of the electronic apparatus may be provided in the plate-like component 26.

In the first example, as illustrated in FIG. 10, the front casing 3a (casing 3) and the plate-like component 26 are formed integrally. More specifically, the plate-like component 26 formed by insert molding is disposed on the inner surface of the front casing 3a. However, the plate-like component 26 and the front casing 3a (casing 3), for example, may be formed separately and the plate-like component 26 may be fixed to the front casing 3a. The plate-like component 26 may be fixed to the casing 3 through a component fixed to the casing 3. An opening 44 is provided on the plate-like component 26. The plate-like component 26 includes a first surface 60 facing the cover panel 2 and a second surface 61 positioned on the opposite side to the first surface 60.

Referring again to FIGS. 9 and 10, the printed board 27, to which various components such as the CPU 11 and the DSP 12 are mounted, is disposed so as to face the second surface 61 of the plate-like component 26. The printed board 27 is electrically connected to an electronic component included in the electronic apparatus 1 by the cable 25. In the example of FIG. 9, the printed board 27 is connected with the touch panel 17, the display device 16, the piezoelectric vibrating element 19, and the rear imaging unit 8 by four cables 25. The battery 21 is installed such that the battery 21 faces the surface positioned on the opposite side to the surface on the plate-like component 26 side in the printed board 27.

A holder 28, which is provided in the casing 3 and holds a component, may be included in the electronic apparatus 1. The holder 28 illustrated in FIGS. 9 and 10 holds a rear imaging unit 8 (that is, the imaging device 8a and the lighting device 8b), and is mounted on the front casing 3a. The components in the electronic apparatus 1 can be organized by providing the holder 28 on an area with the components collectively arranged therein.

The back casing 3b is provided so as to face the battery 21. The back casing 3b in the first example is integrally molded with a supporting structure 29. That is, the supporting structure 29 can be a part of the back casing 3b. Similarly to the plate-like component 26, the supporting structure 29 is provided for reducing deformation and cracks of the cover panel 2 due to a load from the outside. The supporting structure 29 extends through the opening 44 and supports the cover panel 2. In the present embodiment, an area supported by the supporting structure 29 in the cover panel 2 is referred to as a "third area 42." Since the third area 42 is supported by the supporting structure 29, the third area 42 has resistance to deformation and breakage even when a load is applied from the outside. The supporting structure 29 is made of, for example, the same material as that of the casing 3.

As shown in FIGS. 9 and 10, the supporting structure 29 is smaller than the opening 44 because the supporting structure 29 extends through the opening 44. Therefore, the third area 42 supported by the supporting structure 29 is inside of the area facing the opening 44 in the cover panel 2. As illustrated in FIG. 11, the area facing the opening 44 in the cover panel 2 is inside of the first area 40 supported by the casing 3, and is separated from (or adjacent to) the first area 40 and the second area 41. Accordingly, the third area 42 is positioned between the first area 40 and the second area 41, and is separated from the first area 40 and the second area 41. In FIG. 11, the third area 42 is indicated by a striped pattern. An area which is not supported by the front casing 3a in the cover panel 2 (that is, an area other than the first area 40, the second area 41, and the third area 42 in the cover panel 2) is referred to as a "fourth area 43."

In the example of FIGS. 9 and 10, the supporting structure 29 is provided in the area facing the opening 44 in the back casing 3b. However, the area with the supporting structure 29 provided therein is not particularly limited thereto. For example, the supporting structure 29 may be provided in the area constituting the side surface of the electronic apparatus 1 in the casing 3. For example, the supporting structure 29 can be formed such that the supporting structure 29 extends to the inside from the inner surface of the area constituting the side surface of the electronic apparatus 1 in the casing 3, and can be curved in the form of a character L toward the opening 44. The supporting structure 29 in the form of a character L supports the cover panel 2. In the casing 3, as illustrated in FIGS. 9 and 10, the cover panel 2 can be more reliably supported by adopting the supporting structure 29 linearly extending from the area facing the opening 44, passing through the opening 44, and supporting the cover panel 2, than by adopting the supporting structure in the form of a character of L.

Front Casing and Plate-Like Component

Figure 12:
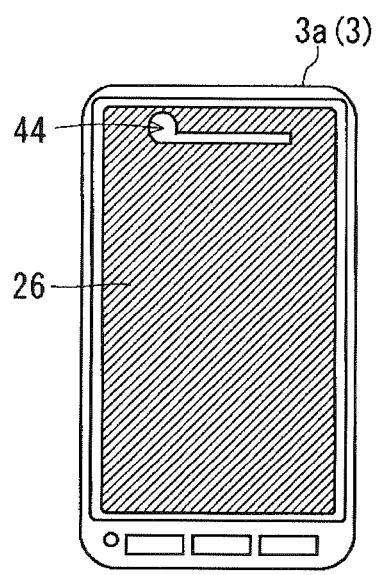
FIG. 12 is a view illustrating an example of a front casing and a plate-like component.

FIG. 12 is a front view illustrating the front casing 3a and the plate-like component 26. As described above, the front casing 3a is integrally formed with the plate-like component 26. As illustrated in FIG. 12, for example, the plate-like component 26, indicated by oblique lines, is provided in the front casing 3a. The plate-like component 26 has, for example, a substantially rectangular shape in a plan view.

The plate-like component 26 is provided with an opening 44. As illustrated in FIGS. 9 and 12, the opening 44 is, for example, a through-hole that penetrates from the first surface 60 to the second surface 61. The opening 44 is provided in an area which is intended to be passed through by the cable 25, an area which may be an interruption for the arrangement of an electronic component constituting the electronic apparatus 1 such as the front imaging unit 4, or an area where a metal (which is a material of the plate-like component 26) may become an interruption to the properties of the antenna 15.

The opening 44 illustrated in FIG. 12 has a shape in which a rectangular through-hole is combined with a circular through-hole. A plurality of cables 25 pass through the rectangular through-hole as illustrated in FIG. 9. In this manner, the cable 25 can be efficiently wired by wiring the cable 25 using the opening 44. Further, the front imaging unit 4 is provided in the circular through-hole. Since the front imaging unit 4 is, for example, mounted on the printed board 27 or held by the holder 28, the front imaging unit 4 extends through the circular through-hole and is exposed (see FIG. 1) to the front surface of the electronic apparatus 1. The supporting structure 29 may extend through the circular through-hole.

Figure 13:
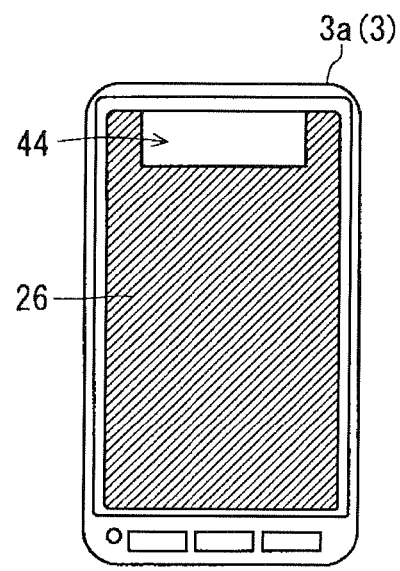
FIG. 13 is a view illustrating an example of a front casing and a plate-like component.

The shape, the position, and the size of the opening 44 illustrated in FIG. 12 are merely examples. The opening 44 may be provided as illustrated in FIG. 13. FIG. 13 is a view illustrating the front casing 3a and the plate-like component 26. In FIG. 13, the plate-like component 26 is indicated by oblique lines in the same manner as that of FIG. 12.

In the plate-like component 26 illustrated in FIG. 13, the opening 44 is a notch. As illustrated in FIG. 13, even in the case where the opening 44 is formed of a notch, it is possible for the supporting structure 29 to extend through the opening 44 and support the cover panel 2.

In the examples of FIGS. 12 and 13, the opening 44 is formed to be long and narrow in the short-length direction of the plate-like component 26. However, for example, the opening 44 may be formed to be long and narrow in the longitudinal direction of the plate-like component 26. In addition, in the examples of FIGS. 12 and 13, the opening 44 is provided in an upper end when the plate-like component 26 is seen in a plan view. However, for example, the opening 44 may be provided on a lower end when the plate-like component 26 is seen in a plan view. The shape or the position of the opening 44 can be appropriately changed according to a purpose of providing the opening 44.

Shape of Supporting Structure

Figure 14:
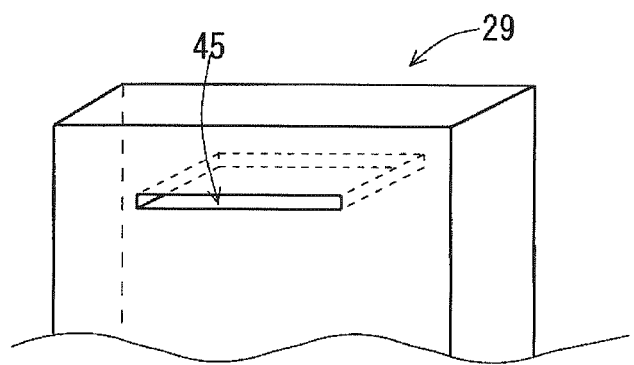
FIG. 14 is a view illustrating an example of a supporting structure.

FIG. 14 illustrates an example of the supporting structure 29. An opening 45 through which the cable 25 passes is provided in the supporting structure 29. Therefore, the supporting structure 29 does not interrupt the wiring of the cable 25 when the opening 45 is provided in the supporting structure 29.

Figure 15:
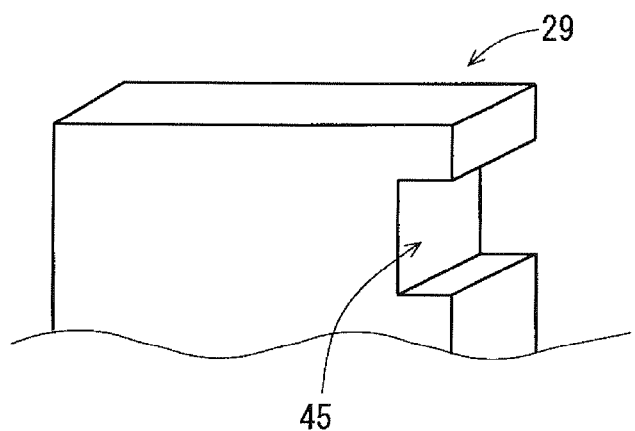
FIG. 15 is a view illustrating an example of a supporting structure.

The position, the size, and the shape of the opening 45 are not limited to the example illustrated in FIG. 14 and can be appropriately changed according to the shape of the cable 25 and the position of the cable 25 as it passes through the opening 45. For example, as illustrated in FIG. 15, the opening 45 may be a notch. In addition, in the supporting structure 29 illustrated in FIG. 14, only one opening 45 is provided. However, a plurality of openings 45 may be provided in one supporting structure 29.

In other examples, the cable 25 can be arranged without passing through the opening 45 in order to stably support the third area 42 of the cover panel 2 in view of maintaining the quality of the supporting structure 29. In the example of FIG. 9, since the cable 25 connecting the touch panel 17 with the printed board 27 is arranged so as to pass through the display device 16 and the component 26, the cable 25 does not pass through the opening 45 provided in the supporting structure 29. Similarly, since the cable 25 connecting the display device 16 with the printed board 27 is arranged so as to pass through the display device 16 and the component 26, the cable 25 does not pass through the opening 45 provided in the supporting structure 29. In this manner, in the examples where the cable 25 is arranged so as to pass through the display device 16 and the component 26, the opening 45 through which the cable 25 passes is not necessarily provided in the supporting structure 29.

Figure 16:
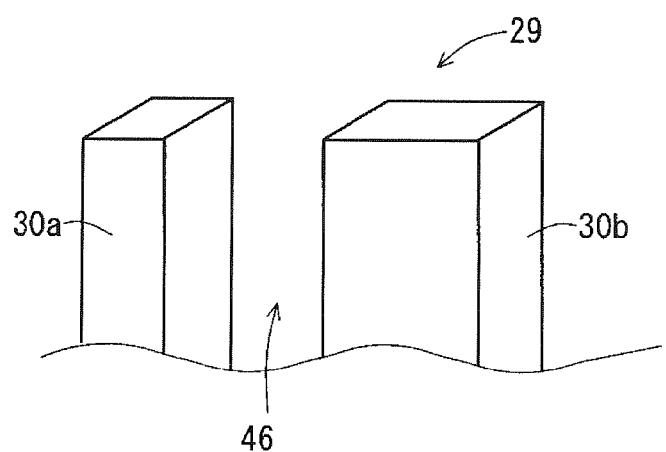
FIG. 16 is a view illustrating an example of a supporting structure.

As illustrated in FIG. 16, the supporting structure 29 may have a plurality of supporting portions 30a and 30b separated from each other instead of providing the opening 45 in the supporting structure 29. Hereinafter, when the supporting portions 30a and 30b do not have to be distinguished from each other, they are referred to as supporting portions 30. As illustrated in FIG. 16, a gap 46 is present between the supporting portions 30a and 30b. The cable 25 is arranged by passing through the gap 46. In this manner, the supporting structure 29 does not interrupt the wiring of the cable 25 when the cable 25 passes through the gap 46 of the plurality of supporting portions 30 constituting the supporting structure 29.

The shape and the size of the supporting portions 30 constituting the supporting structure 29 may be different from each other. In the supporting structure 29 illustrated in FIG. 16, the supporting portion 30b is larger than the supporting portion 30a. The supporting structure 29 illustrated in FIG. 16 has two supporting portions 30. However, the number of the supporting portions 30 constituting the supporting structure 29 is not limited to two.

Second Example Embodiment

Figure 17:
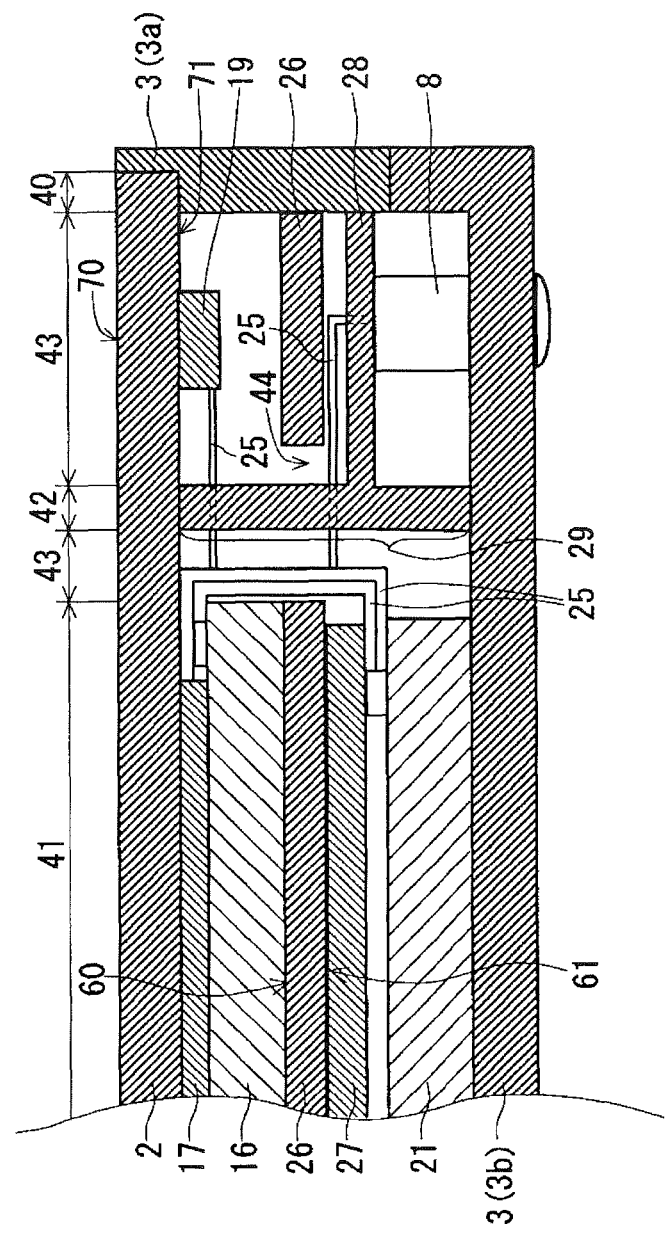
FIG. 17 is a view illustrating an example of a cross section of an electronic apparatus.
Figure 18:
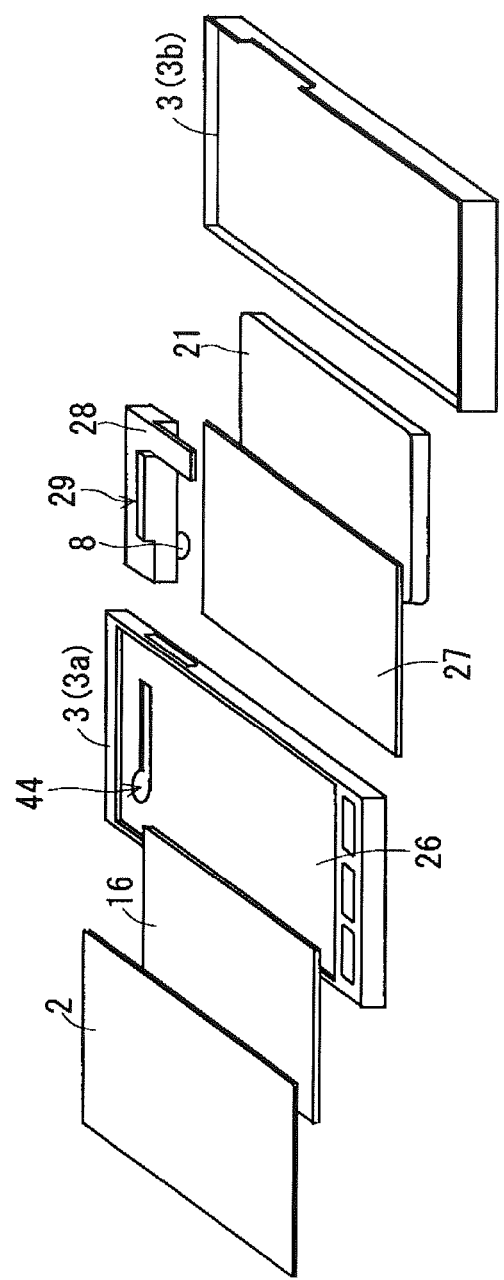
FIG. 18 is an exploded perspective view illustrating an example of an electronic apparatus.

FIG. 17 is a cross-sectional view of an electronic apparatus 1 according to a second example embodiment. FIG. 18 is an exploded perspective view illustrating the electronic apparatus 1 according to the second example embodiment. In FIG. 18, similarly to FIG. 10, some of the components included in the electronic apparatus 1, such as a touch panel 17, are omitted for avoiding complexity in the drawing.

As illustrated in FIGS. 17 and 18, in the second example embodiment, a holder 28 and a supporting structure 29 are integrally formed. A back casing 3b and the supporting structure 29 are not integrally formed. The rest of the configuration of the electronic apparatus 1 in the second example embodiment is the same as that of the first example embodiment.

The holder 28 illustrated in FIGS. 17 and 18 is fixed to a front casing 3a in the same manner as the holder 28 described in the first example embodiment. When the electronic apparatus 1 is assembled from the front casing 3a side, the holder 28 is fixed to the front casing 3a, and the supporting structure 29 extends through an opening 44. Specifically, when the electronic apparatus 1 illustrated in FIGS. 17 and 18 is assembled from the front casing 3a side. First, components such as the touch panel 17, a display device 16, and a piezoelectric vibrating element 19, which are present on the first surface 60 side of the plate-like component 26, are mounted on a cover panel 2. Subsequently, the front casing 3a is mounted on the cover panel 2. The holder 28 is fixed to the front casing 3a. At this time, the supporting structure 29 integrally formed with the holder 28 extends through the opening 44 and the cover panel 2 is supported by the supporting structure 29.

In contrast, for example, when the supporting structure 29 is integrally formed with the back casing 3b, and the electronic apparatus 1 is assembled from the front casing 3a side, all components other than the back casing 3b are assembled, and then the back casing 3b is mounted thereon in a final process of assembling the electronic apparatus 1. In the process of mounting the back casing 3b, the supporting structure 29 extends through the opening 44.

The holder 28 accommodated in the casing 3 is smaller than the back casing 3b. Therefore, when the supporting structure 29 is extended through the opening 44, the opening 44 and the supporting structure 29 can be seen at the same time in spite of the presence of the holder 28. Accordingly, the electronic apparatus 1 can be assembled easily.

In the above description, the holder 28 is fixed to the front casing 3a. However, other configurations may be used. For example, the holder 28 may be fixed to the back casing 3b.

Third Example Embodiment

Figure 19:
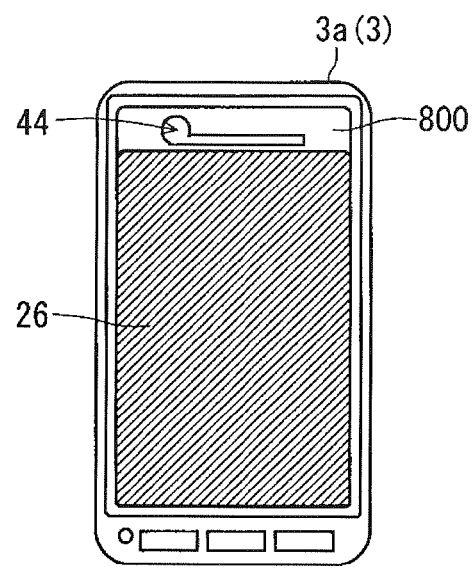
FIG. 19 is a view illustrating an example of a front casing and a plate-like component.
Figure 20:
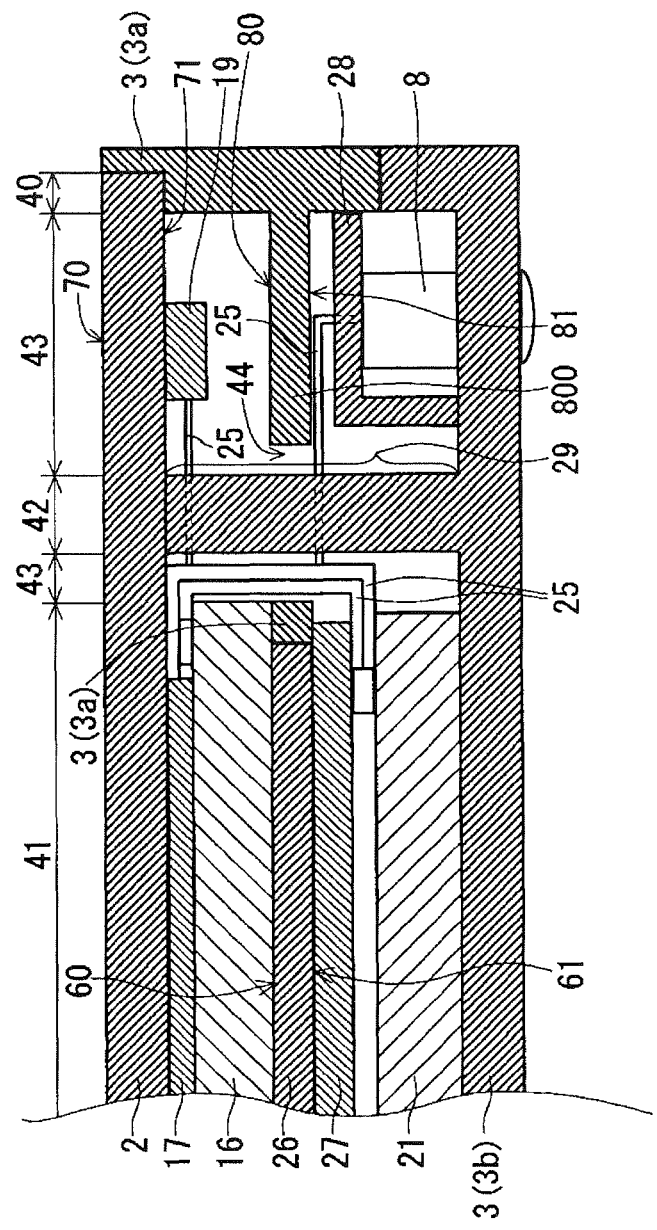
FIG. 20 is a view illustrating an example of a front casing and a plate-like component.

FIG. 19 is a view illustrating a front casing 3a and a plate-like component 26 according to a third example embodiment. In FIG. 19, the plate-like component 26 is indicated by oblique lines. FIG. 20 is a cross-sectional view illustrating an electronic apparatus 1 according to the third example embodiment.

In the front casing 3a and the plate-like component 26 according to third example embodiment, an opening 44 is provided in the front casing 3a, and which is different from that of the first example embodiment in which the opening 44 is provided in the plate-like component 26. The rest of the configuration of the electronic apparatus 1 in the third example embodiment is the same as that of the first example embodiment.

The plate-like component 26 according to the first example embodiment extends to the side surface supporting the edge area (the first area 40) of the cover panel 2 in the casing 3, but the plate-like component 26 according to the third example embodiment does not extend to the side surface. The front casing 3a according to the third example embodiment includes a projection 800 extending to the inside of the casing 3 from the inner surface of the side surface supporting the edge area of the cover panel 2 as illustrated in FIGS. 19 and 20. The projection 800 extends to the plate-like component 26 so as to face the cover panel 2. The projection 800 includes a first surface 80 facing the cover panel 2 and a second surface 81 on the opposite side to the first surface 80. The opening 44 is a through-hole penetrating into the projection 800 from the first surface 80 to the second surface 81.

In this manner, even when the opening 44 is provided in the front casing 3a, the supporting structure 29 can support the cover panel 2 because the supporting structure 29 extends through the opening 44 as illustrated in FIG. 20. Therefore, the opening 44 may be provided in the front casing 3a.

Figure 21:
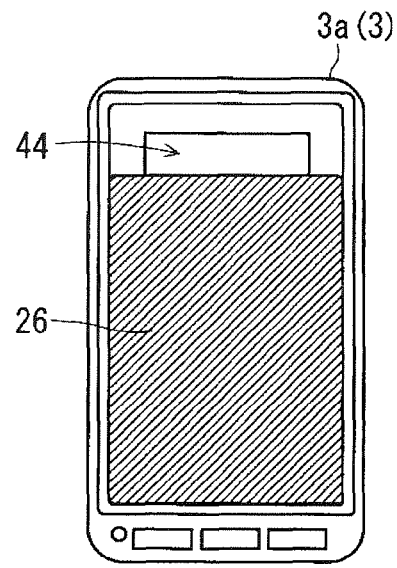
FIG. 21 is a view illustrating an example of a cross section of an electronic apparatus.

The opening 44 provided in the front casing 3a may be a notch provided in the front casing 3a as illustrated in FIG. 21. FIG. 21 is a view illustrating the front casing 3a and the plate-like component 26. In FIG. 21, the plate-like component 26 is indicated by oblique lines in the same manner as that of FIG. 19. As illustrated in FIG. 21, even when the opening 44 is a notch provided in the front casing 3a, the supporting structure 29 can support the cover panel 2 because the supporting structure 29 extends through the opening 44.

The front casing 3a with the opening 44 provided therein and the plate-like component 26 may be adopted in the second example embodiment.

Fourth Example Embodiment

Figure 22:
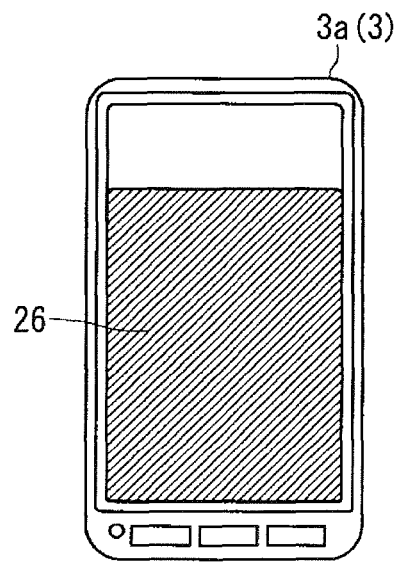
FIG. 22 is a view illustrating an example of a front casing and a plate-like component.
Figure 23:
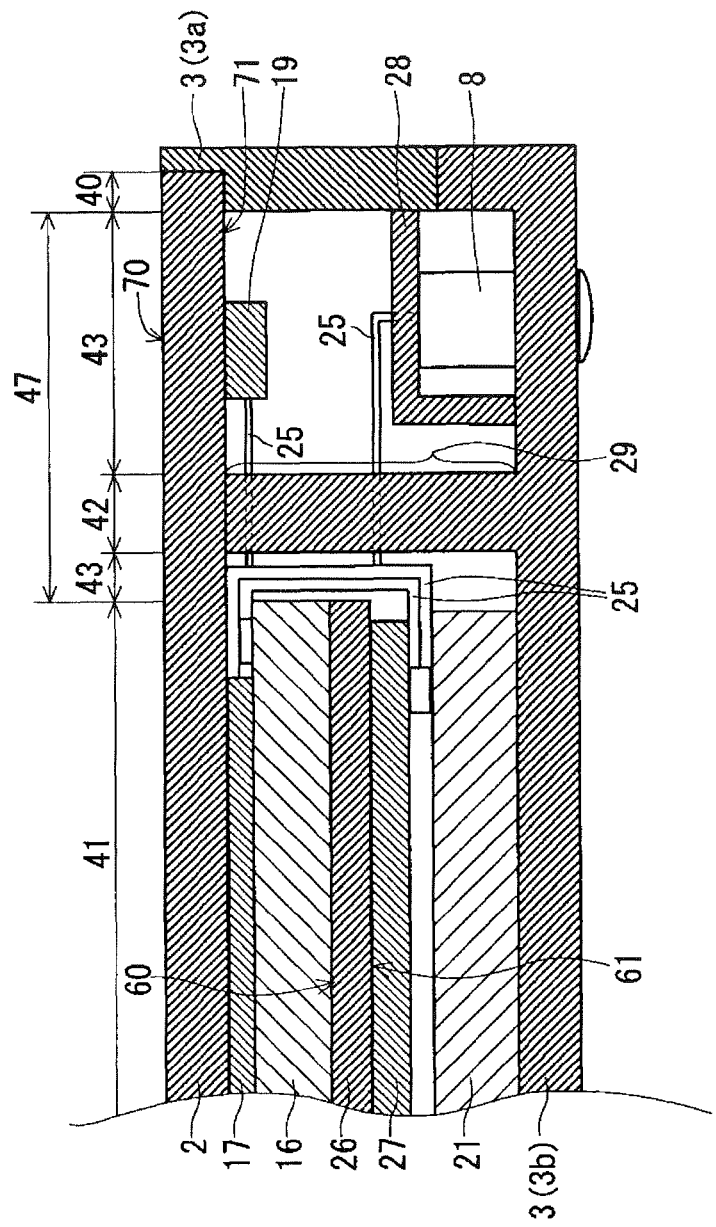
FIG. 23 is a view illustrating an example of a cross section of an electronic apparatus.

FIG. 22 is a view illustrating a front casing 3a and a plate-like component 26 according to a fourth example embodiment. The plate-like component 26 is indicated by oblique lines in FIG. 22. FIG. 23 is a cross-sectional view illustrating an electronic apparatus 1 according to the fourth example embodiment.

The plate-like component 26 according to the fourth example embodiment does not extend to a side surface supporting the edge area of a cover panel 2 in a casing 3 in the same manner as that of the third example embodiment. The size of the plate-like component 26 is the same as that of a display device 16 in a plan view. In the cover panel 2, a second area 41 faces the plate-like component 26 through the display device 16. A front casing 3a does not include a projection 800 as does the third example embodiment. An area 47 which does not face both of the front casing 3a and the plate-like component 26 is present in the cover panel 2. The rest of the configuration of the electronic apparatus 1 in the fourth example embodiment is the same as that of the first example embodiment.

In the fourth example embodiment, a supporting structure 29 supports an area 47 which does not face both the front casing 3a and the plate-like component 26 in the cover panel 2. In the cover panel 2, a third area 42 supported by the supporting structure 29 is positioned between a first area 40 supported by the casing 3 and a second area 41 facing the plate-like component 26 and the display device 16, and is separated from the first area 40 and the second area 41.

In this manner, in fourth example embodiment, the cover panel 2 has resistance to breakage because the cover panel 2 is supported by the supporting structure 29.

The front casing 3a and the plate-like component 26 according to the second example embodiment of FIG. 17 can be adopted in the fourth example embodiment.

Fifth Example Embodiment

Figure 24:
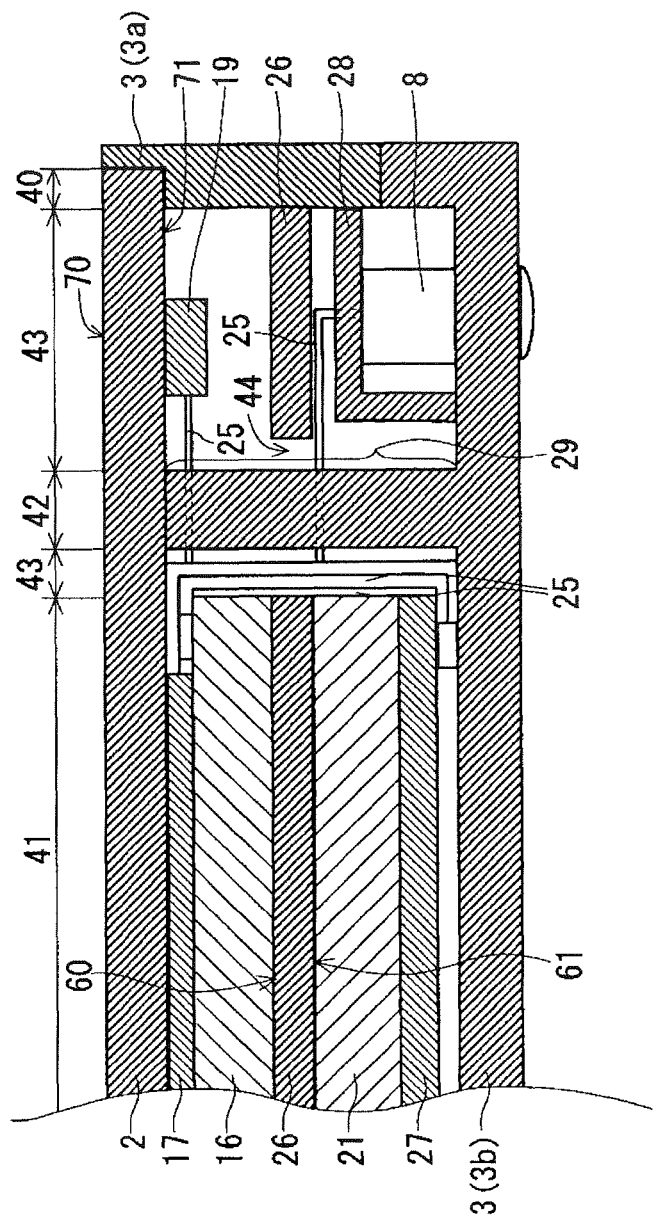
FIG. 24 is a view illustrating an example of a cross section of an electronic apparatus.

FIG. 24 is a cross-sectional view of an electronic apparatus 1 according to a fifth example embodiment. As illustrated in FIG. 24, a plate-like component 26, a battery 21, and a printed board 27 are disposed from the front surface side to the rear surface side of the electronic apparatus 1 in this order. That is, the positions of the printed board 27 and the battery 21 of the electronic apparatus 1 described in the first example embodiment, shown in FIG. 9, are switched with each other. The rest of the configuration of the electronic apparatus 1 in the fifth example embodiment is the same as that of the first example embodiment.

In this manner, even when the positions of the printed board 27 and the battery 21 are switched with each other, the cover panel 2 can be supported by the supporting structure 29 similarly to that of the first example embodiment described above. In addition, in the second example embodiment, in the third example embodiment, or in the fourth example embodiment, the positions of the printed board 27 and the battery 21 may be switched with each other.

Sixth Example Embodiment

Figure 25:
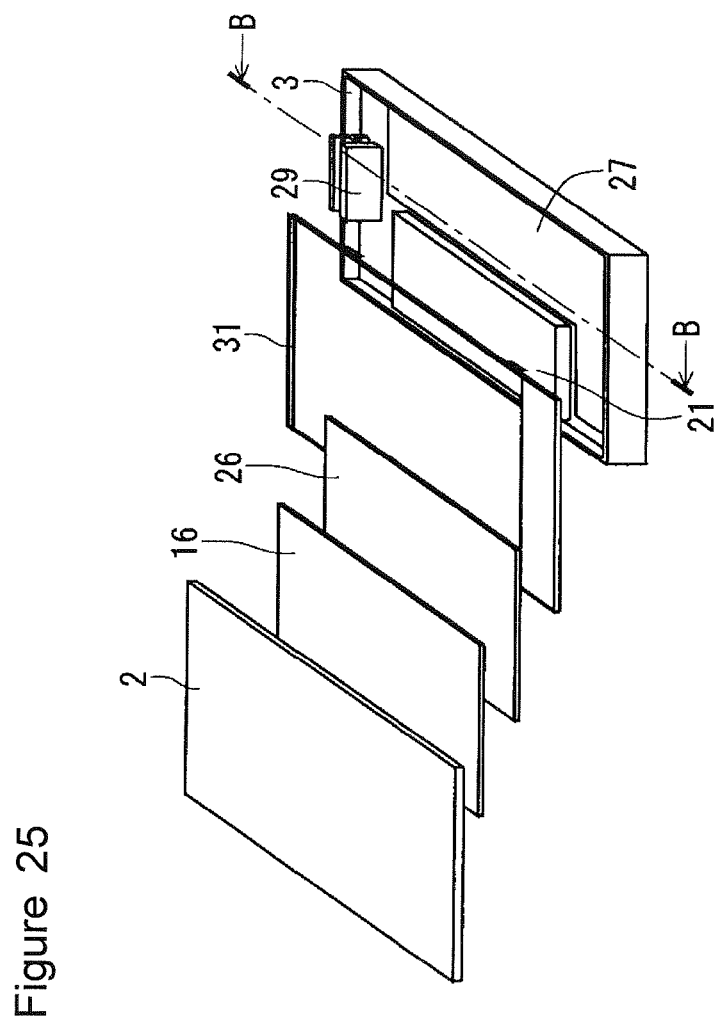
FIG. 25 is an exploded perspective view illustrating an example of an electronic apparatus.
Figure 26:
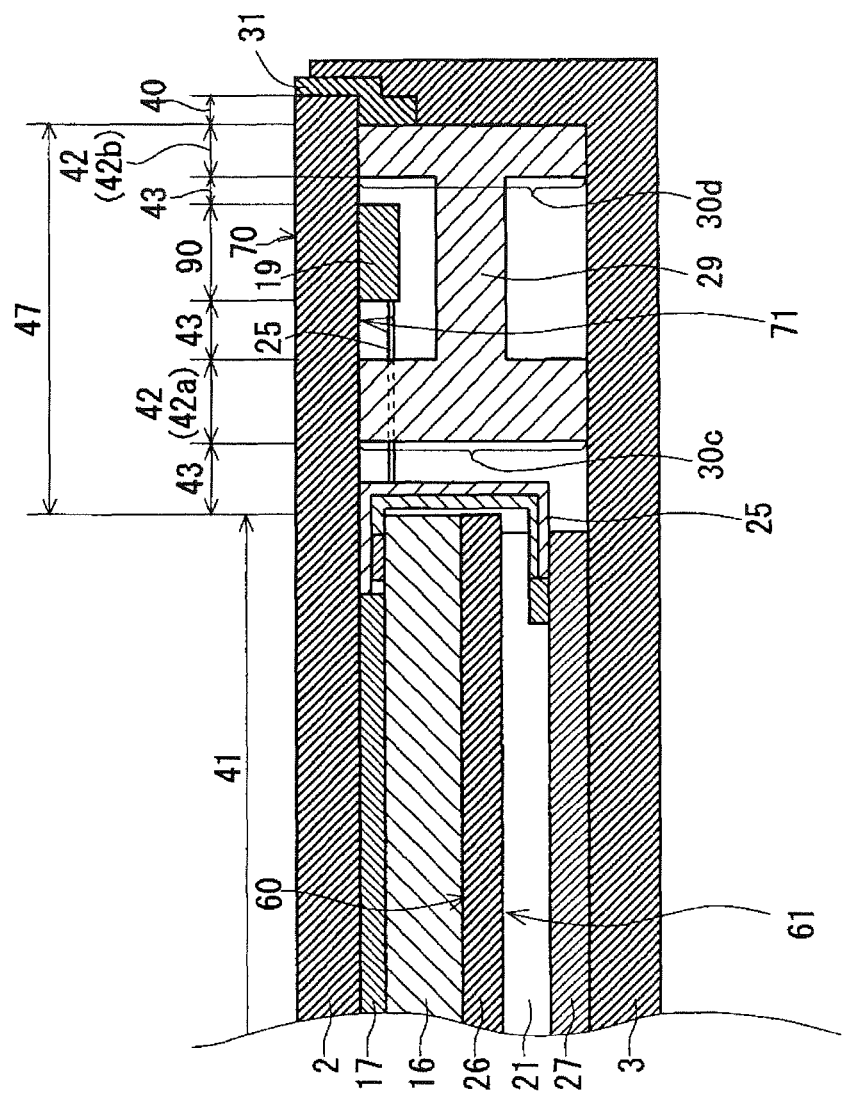
FIG. 26 is a view illustrating an example of a cross section of an electronic apparatus.

FIG. 25 is an exploded perspective view of an electronic apparatus 1 according to a sixth example embodiment. FIG. 26 is a cross-sectional view of the electronic apparatus 1 according to the sixth example embodiment. FIG. 26 is a cross-sectional view of the electronic apparatus 1 taken along a line B-B illustrated in FIG. 25. As illustrated in FIGS. 25 and 26, casing 3 is configured of one member and has a substantially box shape of which one surface is opened.

Since the casing 3 is configured of one member, the electronic apparatus 1 is assembled from the rear surface side. More specifically, as illustrated in FIGS. 25 and 26, a battery 21 and a printed board 27 are disposed on the inner bottom surface of the casing 3. Next, a second surface 61 of a plate-like component 26 is disposed so as to face the battery 21 and the printed board 27. The size of the plate-like component 26 is the same as that of the display device 16 in a plan view similarly to the fourth example embodiment. Next, the display device 16 is provided so as to face a first surface 60 of the plate-like component 26. A cover panel 2 and a touch panel 17 are provided so as to face the display device 16. A piezoelectric vibrating element 19 is attached to the cover panel 2. However, the sixth example embodiment is not limited thereto and a normal dynamic receiver may be included.

The electronic apparatus 1 according to the sixth example embodiment includes a panel fixing member 31 for fixing the cover panel 2 and the casing 3. The panel fixing member 31 is fixed to the edge area of the second surface 71 of the cover panel 2. The panel fixing member 31 also is fixed to the side wall of the casing 3. The edge area of the cover panel 2 is fixed to the casing 3 through the panel fixing member 31 in the sixth example embodiment.

In the sixth example embodiment, a supporting structure 29 is provided in the casing 3. The supporting structure 29 is fixed to, for example, the inner bottom surface or the inner side surface of the casing 3. The supporting structure 29 includes supporting portions 30c and 30d. The supporting structure 29 extends between an area facing the plate-like component 26 in the casing 3 and the inner side surface of the casing 3, and supports the cover panel 2. In addition, the supporting structure 29 may be integrally formed with a holder 28 in the same manner as that of the second example embodiment.

Figure 27:
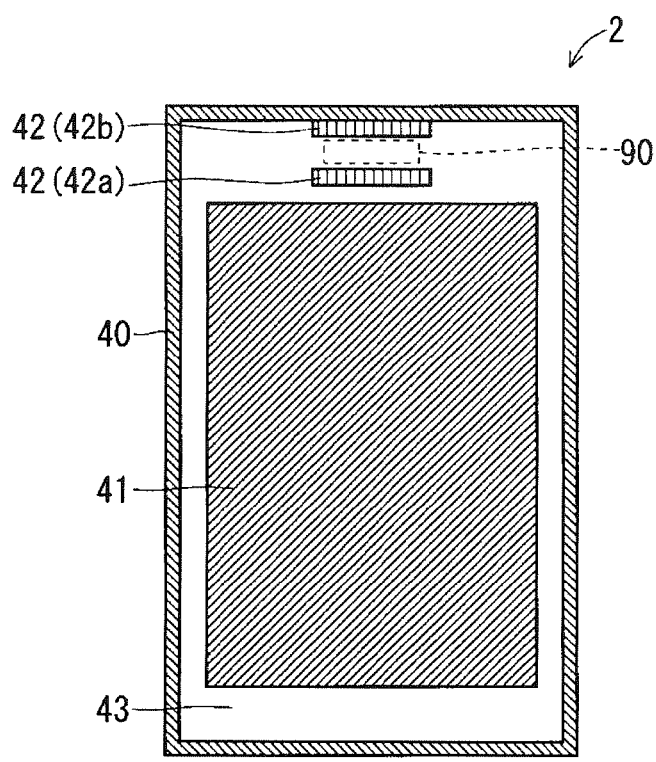
FIG. 27 is a view illustrating an example of a cover panel.

FIG. 27 is a view illustrating the cover panel 2 according to the sixth example embodiment. As shown in FIGS. 26 and 27, first area 40 (left-upward oblique line) which is an area of the edge area of the cover panel 2 is supported by the casing 3 through the panel fixing member 31. A second area 41 (right-upward oblique line) corresponding to the display device 16 in the cover panel 2 is supported by components in the casing 3. Further, a third area 42 is present between the first area 40 and the second area 41 in the cover panel 2. The third area 42 (third area 42a and 42b) is supported by the supporting structure 29. More specifically, the third area 42a is supported by a supporting portion 30c and the third area 42b is supported by a supporting portion 30d. In this manner, in sixth example embodiment, since the cover panel 2 is supported by the supporting structure 29, the cover panel 2 has resistance to breakage.

Moreover, as illustrated in FIGS. 26 and 27, the third area 42 supported by the supporting structure 29 is separated from an area 90 in which the piezoelectric vibrating element 19 is disposed in the cover panel 2. In this manner, vibration of the cover panel 2 due to the piezoelectric vibrating element 19 is difficult to be reduced because the third area 42 supported by the supporting structure 29 is separated from an area 90 in which the piezoelectric vibrating element 19 is disposed in the cover panel 2.

Figure 28:
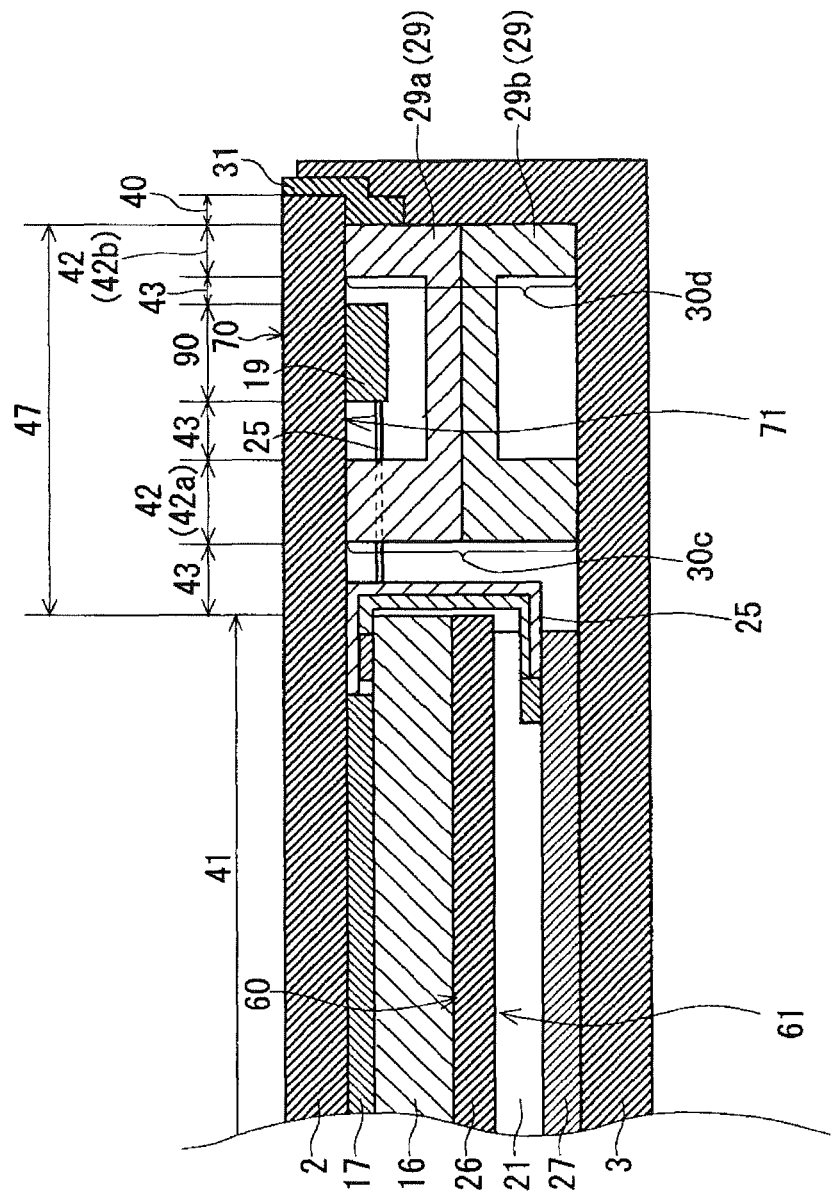
FIG. 28 is a view illustrating an example of a cross section of the electronic apparatus.

In the above-described embodiment, the supporting structure 29 is fixed to the casing 3 and is described as an example. However, the supporting structure 29 may be fixed to the cover panel 2. The supporting structure 29 may be configured of a plurality of members. FIG. 28 is a cross-sectional view of the electronic apparatus 1. The supporting structure 29 illustrated in FIG. 28 is configured of a panel side supporting structure 29a and a casing side supporting structure 29b. More specifically, the panel side supporting structure 29a and the casing side supporting structure 29b are combined to function as the supporting structure 29 illustrated in FIG. 26. The panel side supporting structure 29a and the casing side supporting structure 29b may or may not be fixed to the same component. For example, the panel side supporting structure 29a may be fixed to the cover panel 2, and the casing side supporting structure 29b may be fixed to the casing 3.

Figure 29:
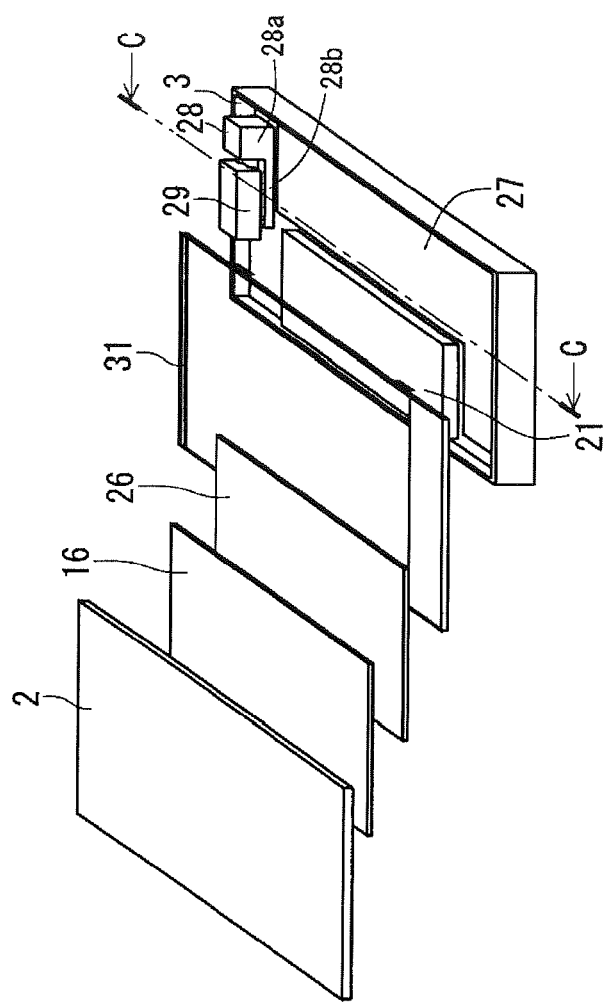
FIG. 29 is an exploded perspective view illustrating and example of an electronic apparatus.
Figure 30:
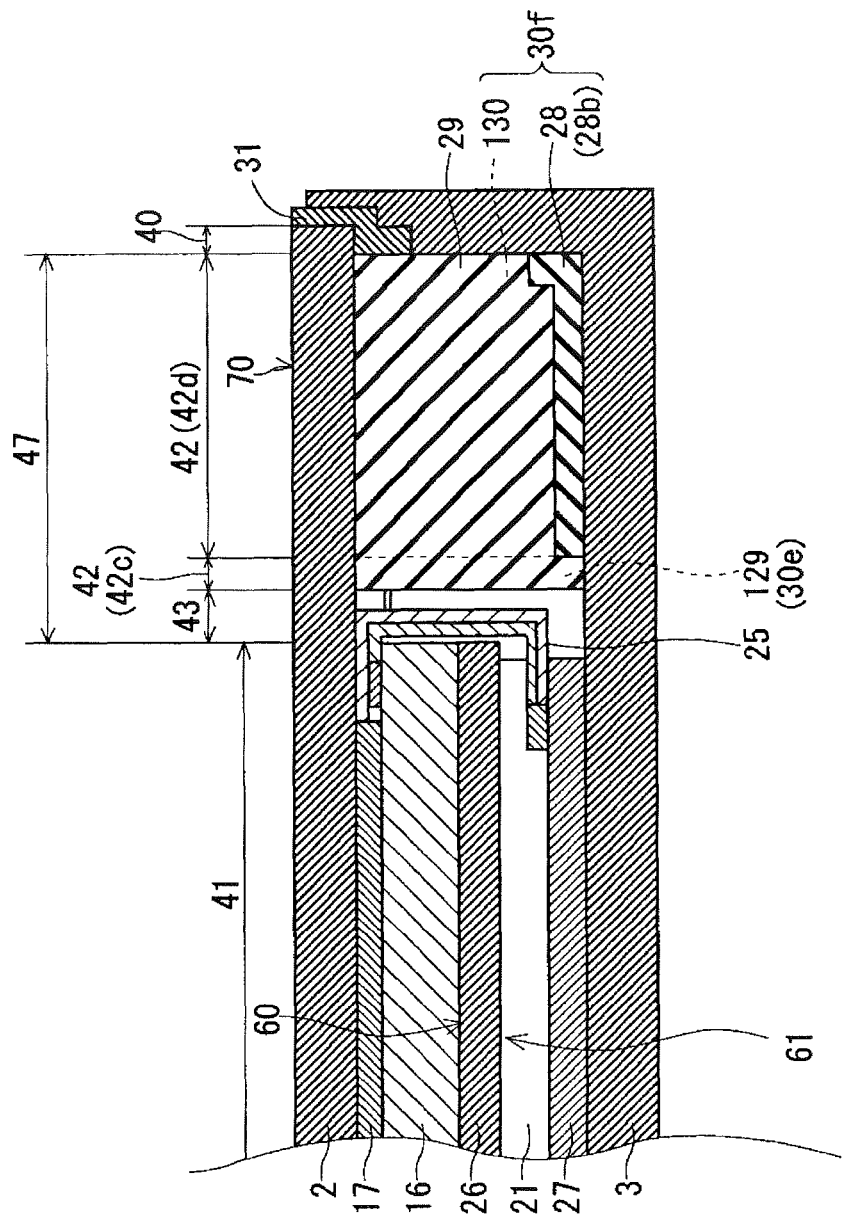
FIG. 30 is a view illustrating an example of a cross section of an electronic apparatus.

The supporting structure 29 illustrated in FIGS. 29 and 30 may be adopted. FIG. 29 is another example of exploded perspective view of the electronic apparatus 1. FIG. 30 is a cross-sectional view of the electronic apparatus 1 taken along a line C-C indicated in FIG. 29. In the electronic apparatus 1 illustrated in FIGS. 29 and 30, the supporting structure 29 and the holder 28 holding a rear imaging unit 8 are separately included. Each of the supporting structure 29 and the holder 28 is directly or indirectly fixed to the casing 3. Here, "indirectly" means that each of the supporting structure 29 and the holder 28 is fixed to the casing 3 through another member.

The holder 28 includes a holding portion 28a holding the rear imaging unit 8 and an extending portion 28b extending along the inner bottom surface of the casing 3. The extending portion 28b is in contact with the inner bottom surface of the casing 3. On the other hand, the supporting structure 29 includes a casing facing portion 129 facing the inner bottom surface of the casing 3 and a holder facing portion 130 facing the extending portion 28b of the holder 28.

As illustrated in FIG. 30, the upper end of the cover panel 2 includes a third area 42c supported by the casing facing portion 129 of the supporting structure 29, and a third area 42d supported by the holder facing portion 130 of the supporting structure 29.

The third area 42c is stably supported by the casing facing portion 129 (supporting portion 30c) directly extending to the third area 42c from the bottom surface of the casing 3 which faces the third area 42c.

On the other hand, the third area 42d is supported by the holder facing portion 130 extending to the third area 42d from the extending portion 28b of the holder 28 which faces the third area 42d. As described above, the extending portion 28b of the holder 28 is in contact with the inner bottom surface of the casing 3. Therefore, the third area 42d is supported by supporting portions 30f which are configured of the holder facing portion 130 and the extending portion 28b which are provided from the bottom surface of the casing 3 to the third area 42d. Consequently, the cover panel 2 can be stably supported at the third area 42d in the same manner as the third area 42c. That is, even when the supporting structure 29 is not provided from the inner bottom surface of the casing 3 to the cover panel 2, the cover panel 2 can be stably supported when the combination of the supporting structure 29 and a component disposed on the bottom surface of the casing 3 is provided from the inner bottom surface of the casing 3 to the cover panel 2. The supporting structure 29 and the component may be provided without a gap from the inner bottom surface of the casing 3 to the cover panel 2.

Since the extending portion 28b of the holder 28 is interposed between the supporting structure 29 (holder facing portion 130) and the inner bottom surface of the casing 3, the holder 28 is difficult to be moved in the casing 3. That is, the holder 28 can be securely fixed to the casing 3 by interposing the extending portion 28b between the supporting structure 29 (holder facing portion 130) and the inner bottom surface of the casing 3.

In the examples of FIGS. 29 and 30, the supporting portions 30f directly extending from the inner bottom surface of the casing 3 to the cover panel 2 are configured of the holder facing portion 130 of the supporting structure 29 and the extending portion 28b of the holder 28. However, the supporting portions 30f may be configured of the supporting structure 29 and a component other than the holder 28 such as a second component. For example, in an example where a dynamic speaker is adopted instead of the piezoelectric vibrating element 19, the supporting portions 30f may be configured of the dynamic speaker and the supporting structure 29. In addition, the number of components other than the supporting structure provided in the casing 3 which constitutes the supporting portions 30f may be two or more.

In the examples of FIGS. 29 and 30, the cover panel 2 includes the third area 42c supported by a supporting portion 30e (casing facing portion 129), and the third area 42d supported by the supporting portions 30f (the holder facing portion 130 and the extending portion 28b). However, the cover panel 2 may include only the third area 42c supported by the supporting portion 30e (casing facing portion 129) or only the third area 42d supported by the supporting portions 30f (the holder facing portion 130 and the extending portion 28b).

Figure 31:
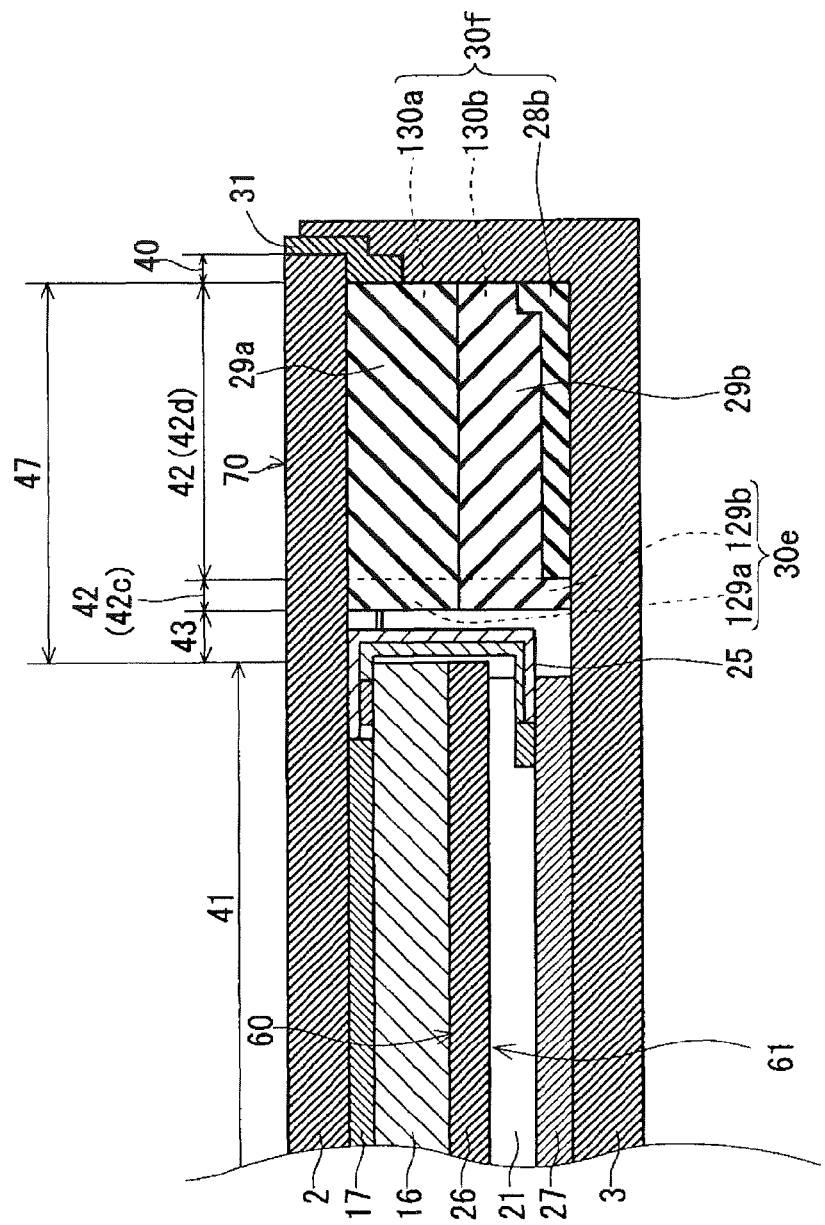
FIG. 31 is a view illustrating an example of a cross section of the electronic apparatus.

In the examples of FIGS. 29 and 30, the supporting structure 29 is fixed to the casing 3, and is described as an example, but the supporting structure 29 may be fixed to the cover panel 2. The supporting structure 29 may be configured of a plurality of components. FIG. 31 is a cross-sectional view of the electronic apparatus 1 corresponding to FIG. 30. The supporting structure illustrated in FIG. 31 is configured of the panel side supporting structure 29a and the casing side supporting structure 29b in the same manner as the supporting structure illustrated in FIG. 28. More specifically, the panel side supporting structure 29a and the casing side supporting structure 29b are combined to function as the supporting structure 29 illustrated in FIG. 30. The panel side supporting structure 29a and the casing side supporting structure 29b may or may not be fixed to the same component. For example, the panel side supporting structure 29a may be fixed to the cover panel 2 and the casing side supporting structure 29b may be fixed to the casing 3.

The above-described embodiments are described as applied to a mobile phone. However, all of the above described embodiments can be applied to an electronic apparatus other than the mobile phone such as a smart phone, a tablet terminal and a wearable type electronic apparatus mounting on an arm, digital books, digital cameras, electronic game machines, digital music players, personal digital assistance (PDA), personal handy phone system (PHS), lap top computers, portable TV's, Global Positioning Systems (GPS's) or navigation systems, machining tools, pedometers, health equipment such as weight scales, display monitors, wristwatch, and the like. As described above, the electronic apparatus 1 has been described in detail. However, the above description is merely an example in every aspect, and the present invention is not limited thereto. Further, various modifications described above can be applied in combination as long as they do not contradict each other. In addition, it is understood that numerous modifications which are not exemplified above can be assumed without departing the scope of the present invention.

The invention claimed is:

1. An electronic apparatus, comprising: a panel comprising a first periphery area, a second area inside the periphery area, and a third area inside the periphery area, the first periphery area, the second area, and the third area being part of the same panel and coplanar with each other; a casing that supports a the first periphery area of the panel; a first plate-like component that is disposed inside of the casing, the first plate-like component disposed so as to face the second area and to support the second area; and a supporting structure that supports the third area positioned between the first area and the second area and separated from the first area and the second area in the panel.

2. The electronic apparatus according to claim 1, wherein the first plate-like component comprises an opening, and wherein the supporting structure is mounted on a rear inside surface of the casing, and extends through the opening.

3. The electronic apparatus according to claim 1, wherein the first plate-like component comprises a display device which displays information.

4. The electronic apparatus according to claim 1, further comprising a second component that is disposed inside the casing, wherein the supporting structure is positioned between the second component and the panel.

5. The electronic apparatus according to claim 4, wherein the second component is part of a holder holding an imaging unit that captures an image.

6. The electronic apparatus according to claim 1, wherein the supporting structure includes: a panel side supporting structure that is mounted on the panel; and a casing side supporting structure that is mounted on the casing and supports the third area together with the panel side supporting structure.

7. The electronic apparatus according to claim 6, wherein the casing side supporting structure houses a component positioned between the casing side supporting structure and a rear inside surface of the casing.

8. The electronic apparatus according to claim 6, further comprising a cable that passes through the opening and between the first component and the supporting structure.

9. The electronic apparatus according to claim 1, wherein the supporting structure is configured of a plurality of supporting portions that are separated from one another by separation areas, and the electronic apparatus further includes a cable that passes through the separation areas of the plurality of supporting portions.

10. The electronic apparatus according to claim 1, wherein the panel further comprises: a fourth area inside the periphery and disposed between the third area and the first area; and a piezoelectric vibrating element attached to an inner surface of the panel in the fourth area.

* * * * *